Figure 1:
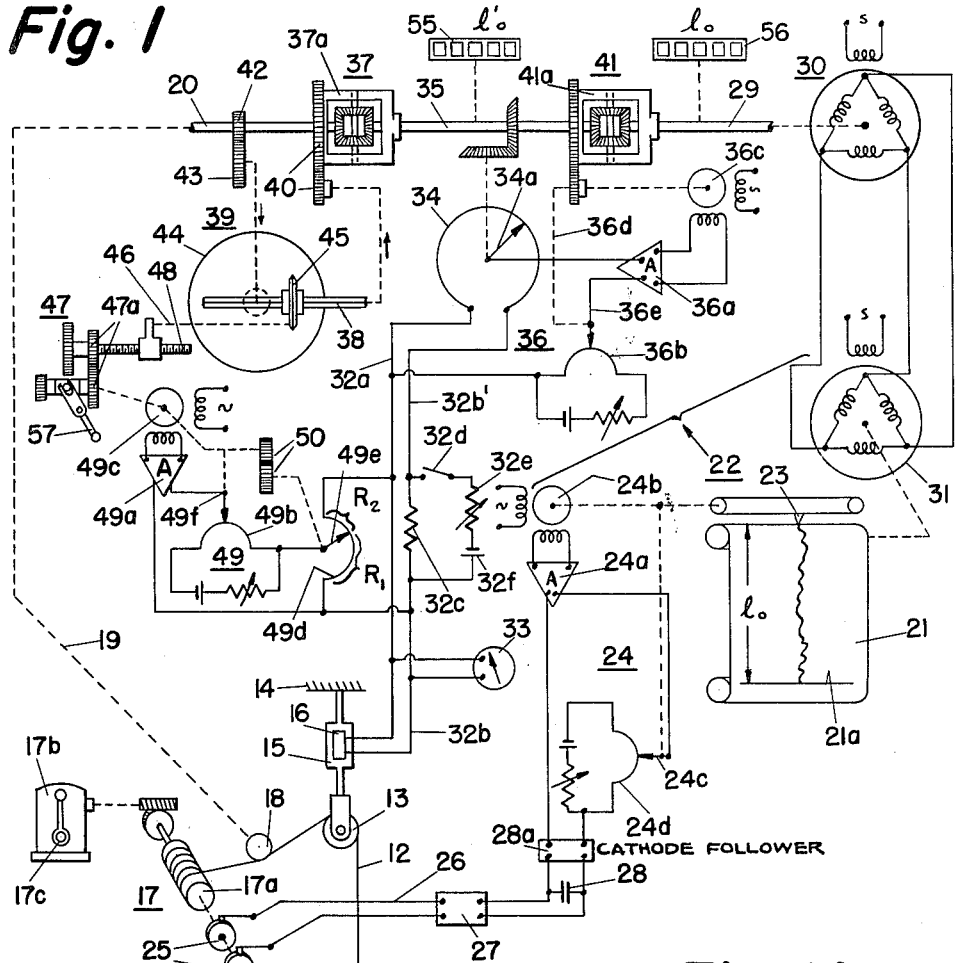

April 3, 1962 R. W. SLOAN 3,027,649
DEPTH MEASURING SYSTEM
Filed Feb. 5, 1958 8 Sheets-Sheet 1

$$\ell_o = \ell_m - \int_0^{\ell_m}\left(\frac{Kt_m}{1+Kt_m}\right)dx_m + \frac{K}{2}T_m\ell_o' \qquad (18)$$

April 3, 1962 — R. W. SLOAN — 3,027,649
DEPTH MEASURING SYSTEM
Filed Feb. 5, 1958 — 8 Sheets-Sheet 2
$$\ell_o = \ell_m - \int_0^{\ell_m} K t_m dx_m + \frac{K}{2} T_m \ell_o' - \frac{K}{2} W_d \ell_o' - \frac{K}{2} w_d S(\ell_o' - S)$$
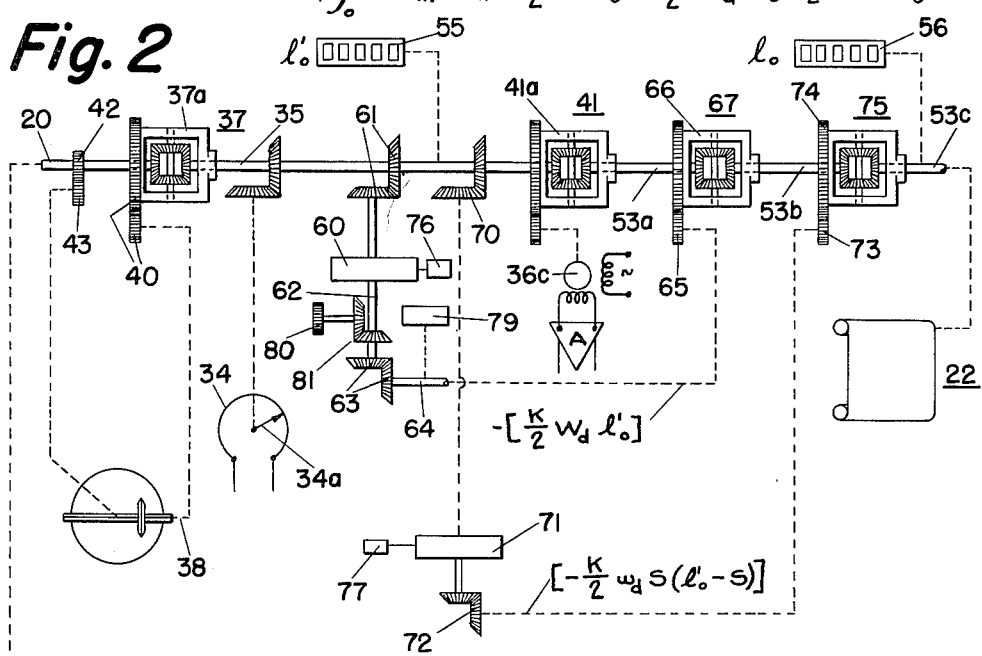
Fig. 2
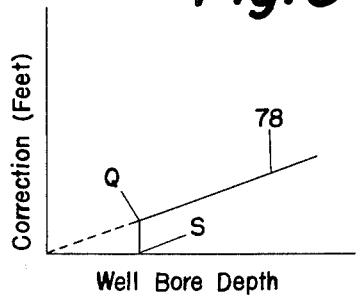
Fig. 3
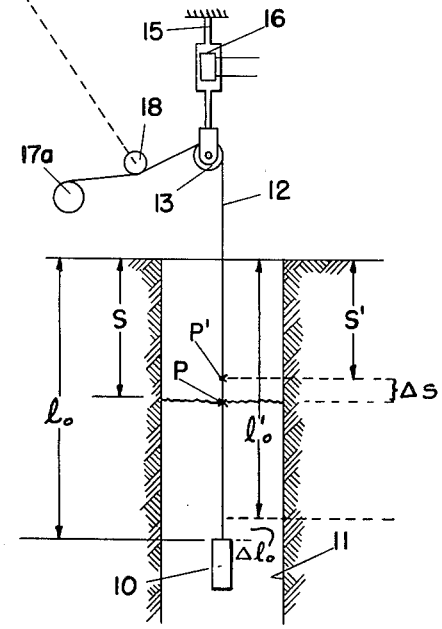
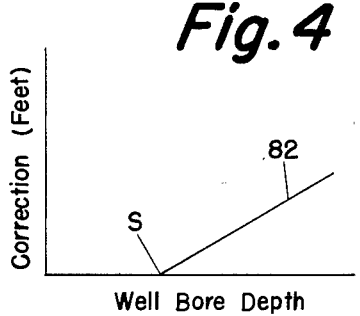
Fig. 4

April 3, 1962  R. W. SLOAN  3,027,649
DEPTH MEASURING SYSTEM
Filed Feb. 5, 1958  8 Sheets-Sheet 8

United States Patent Office 3,027,649
Patented Apr. 3, 1962

3,027,649
DEPTH MEASURING SYSTEM
Raymond W. Sloan, Dallas, Tex., assignor, by mesne assignments, to Socony Mobil Oil Company, Inc., New York, N.Y., a corporation of New York
Filed Feb. 5, 1958, Ser. No. 713,424
72 Claims. (Cl. 33—129)

This invention has for an object the provision of methods of and apparatus for accurately and continuously determining the length of an elastic wire or cable under tension and more particularly to the measurement of the true position of a device suspended from an elastic wire or cable whose length varies with change in the tension applied thereto, as when the cable is payed out and taken in to change the position of the device.

While the present invention is of broad application, it is particularly adapted for use in the logging of a well wherein there is generally recorded some characteristic of earth strata adjacent a well bore as a function of depth. The earth characteristic is obtained by employing an exploration unit or instrument, frequently and generically referred to herein as a logging tool, suspended within a well bore by means of a cable, the length of which may be changed by cable-reeling means located at the surface. The log is generally made while moving the tool uphole or downhole by means of the cable. The cable length is continuously measured or computed to obtain a continuous indication of the tool position within the well bore.

Many systems have been proposed for measuring the cable length and thus the position of the logging tool within the well bore. Some are sheave devices which provide a measurement of the length of cable which passes over the sheave. Other systems have a sensing device responsive to magnetic markings on the cable along its length. Such a system measures the length between the markers as the cable is payed out or taken in. These systems are not sufficiently accurate to meet the usual conditions encountered in the field, particularly the raising and lowering of the tool at a variable velocity. The reasons for the lack of the accuracy of simple sheave measurements may be demonstrated by considering what happens during a typical logging trip of the logging tool within the well bore.

Assuming that the cable initially has been wound on the cable reel under zero pounds of tension, it will begin to stretch as the logging tool is lowered in the well bore. The stretch of the cable will be a function of at least four forces. The first force may be considered as the weight of the logging tool. This weight is considered a constant. The second force will be the weight of the cable. As the tool is lowered in the well bore, the amount of cable in the hole increases, thus increasing the force applied to the cable at the reel. The third force will be the buoyant force of the drilling liquid which will be applied to both the cable and the tool. It will have a magnitude equal to the weight of the liquid displaced by the cable and by the tool. The fourth force will comprise the drag or frictional forces applied by both the drilling liquid or mud and by the wall of the borehole to both the cable and the tool. This fourth force always acts in opposition to the movement of the cable and the tool. For example, as the tool or exploration unit is lowered into the well bore, the fourth force acts upwardly.

As the cable-reeling means is brought to standstill preparatory to a logging run to be taken upwardly of the well bore, the measuring sheave also comes to standstill since it is actuated by the movement of the cable. However, as the cable velocity decreases, the upwardly directed fourth force decreases reaching zero as a limit when the cable and tool are at standstill. The effect of removal of the upwardly directed force is the same as increasing the sum of the downwardly directed forces. As a result, and as the tool and the cable approach standstill, the downhole portion of the cable continues to stretch. The tool continues to move to a new position below the position indicated by the measuring sheave. Errors of this kind are introduced in both the sheave-measuring and magnetic-marker measuring systems.

For an uphole logging operation, the cable-reeling means is energized to take in cable. The measuring sheave immediately indicates a change in position of the logging tool. That tool, however, does not move concurrently with initial actuation of the measuring sheave. It does not move until the upward force developed by the cable at the location of the logging tool exceeds the drag forces which oppose upward movement of the logging tool.

From the foregoing, it will be seen that cable movement can and does occur at the surface without concurrent movement of the logging tool. The response of the magnetic-marker system and the actuation of a measuring sheave, by reason of the stretching of the cable to a point where the tensional forces exceed the drag forces, introduce substantial errors as to the location of the logging tool. Since the magnitude of the total drag forces will be different for different depths and with different conditions within the borehole, the extent of cable stretch required to initiate movement of the logging tool will also be indeterminate.

The error introduced by the indeterminate stretching of the cable is in many cases excessive for the accurate determination of the depth of oil-bearing strata. Such strata, in some cases, may be five feet or less in thickness. With logging cables of the type currently in use and under the conditions above set forth, an undetected stretch of ten feet can take place in a well bore 10,000 feet deep. Therefore, if a log of a well produced by sheave measurement indicates an oil-producing stratum at 10,000 feet, it may in fact be located at 10,010 feet. Should oil-flow from the oil-producing stratum require perforating operations, a dry hole may well result due to the error in measurement. The oil-bearing stratum would not be perforated for oil-flow.

Accordingly, it is a further object of the invention not only to provide an accurate indication of tool position at all times during a logging trip, including those periods when the uphole cable reel is at standstill, but also to assure perforating operations at the desired depth.

In accordance with the present invention, the position of the logging tool in the well bore is determined by modifying the measurement of the length of cable passing by a surface-located measuring sheave by corrective functions of magnitude and sign determined by measurements of the cable tension at the mouth of the well bore and the stretch coefficient of the cable. More particularly, there is provided a means for indicating the position of the exploration tool within the well bore, this means including a position-indicating element. Driving means are provided for moving the element in one direction when paying out cable and in the opposite direction when taking in cable. This driving means is controlled by means responsive to the magnitude of the tension on the cable for moving the position-indicating element after the cable-reeling means is brought to standstill after a downward movement of the tool by an amount corresponding with the elongation of the cable due to the increase in tension on the cable resulting from the disappearance of the opposing drag forces. The tension-responsive means is also arranged to control the driving means so that the position-indicating element is maintained at standstill when the cable is thereafter reeled in until there has been an increase in the tension on the cable to a magnitude adequate to overcome the drag forces. In this manner, the large and substantial errors resulting from the drag forces, which always oppose movement of the exploration tool, have been eliminated. Further, in accordance with the invention, the driving means for the position-indicating element is further controlled to move that element in correspondence with movement of the tool.

As will be later developed at length, the present invention is based upon a number of mathematical concepts which give rise to equations solved by the methods and apparatus of the present invention to yield an indication of the true position of the exploration unit within the well bore. Some of these concepts will now be briefly set forth. If a length of a cable under a predetermined distribution of tension be known, there may then be determined the change in cable length due to a measured change in tension on the cable. The predetermined distribution of tension will be hereafter referred to as the "reference tension." The foregoing will be readily understood by considering a given length or quantity of cable stretched between two points until there is applied thereto the reference tension. There may be readily measured the change in length on the cable with and without application thereto of the reference tension. With this information available, if the same length or quantity of cable be lowered in a well bore and the tension at the surface, due to the weight of the cable and of the exploration unit, be measured, the change in cable length can be determined from the change in measured tension from the reference tension.

Figure 1A:
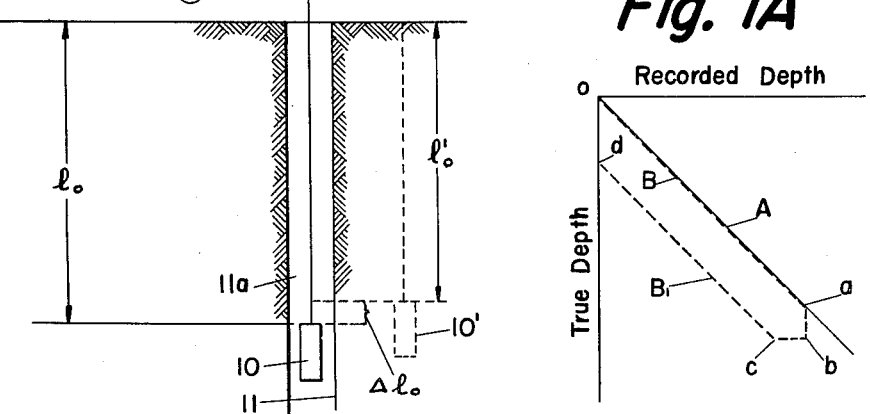
Figure 5:
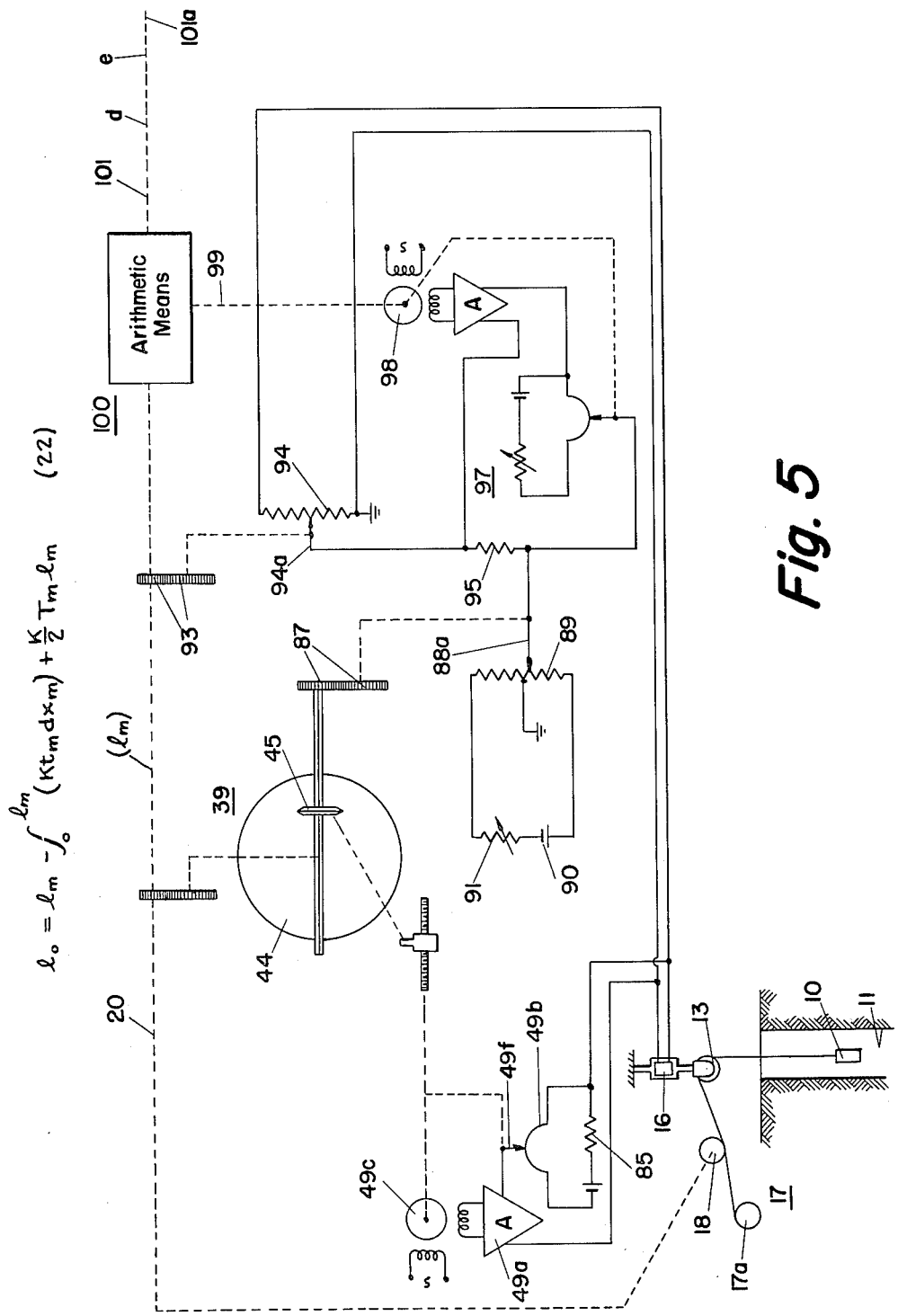
Figure 6:
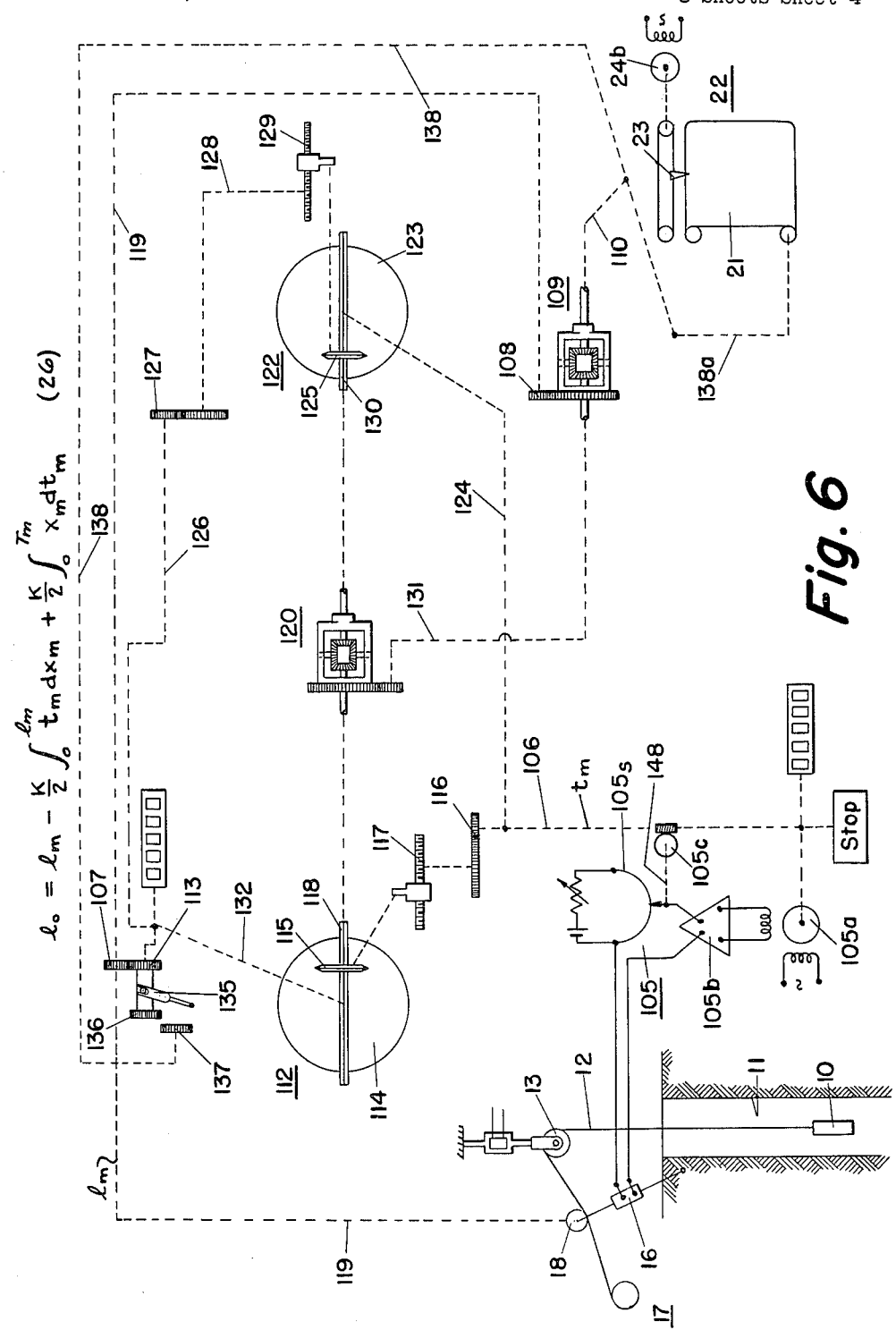
Figure 7:
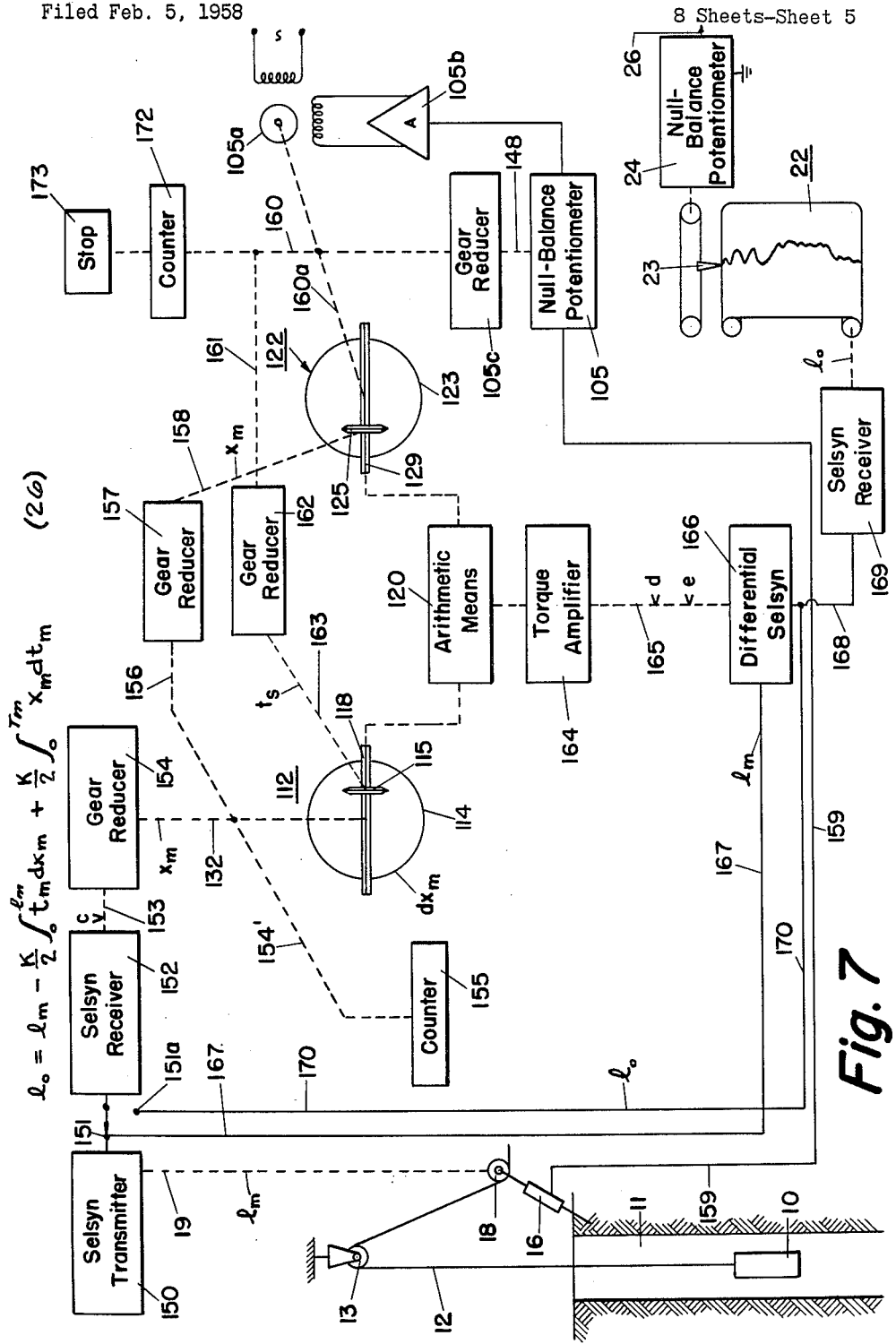
Figure 8:
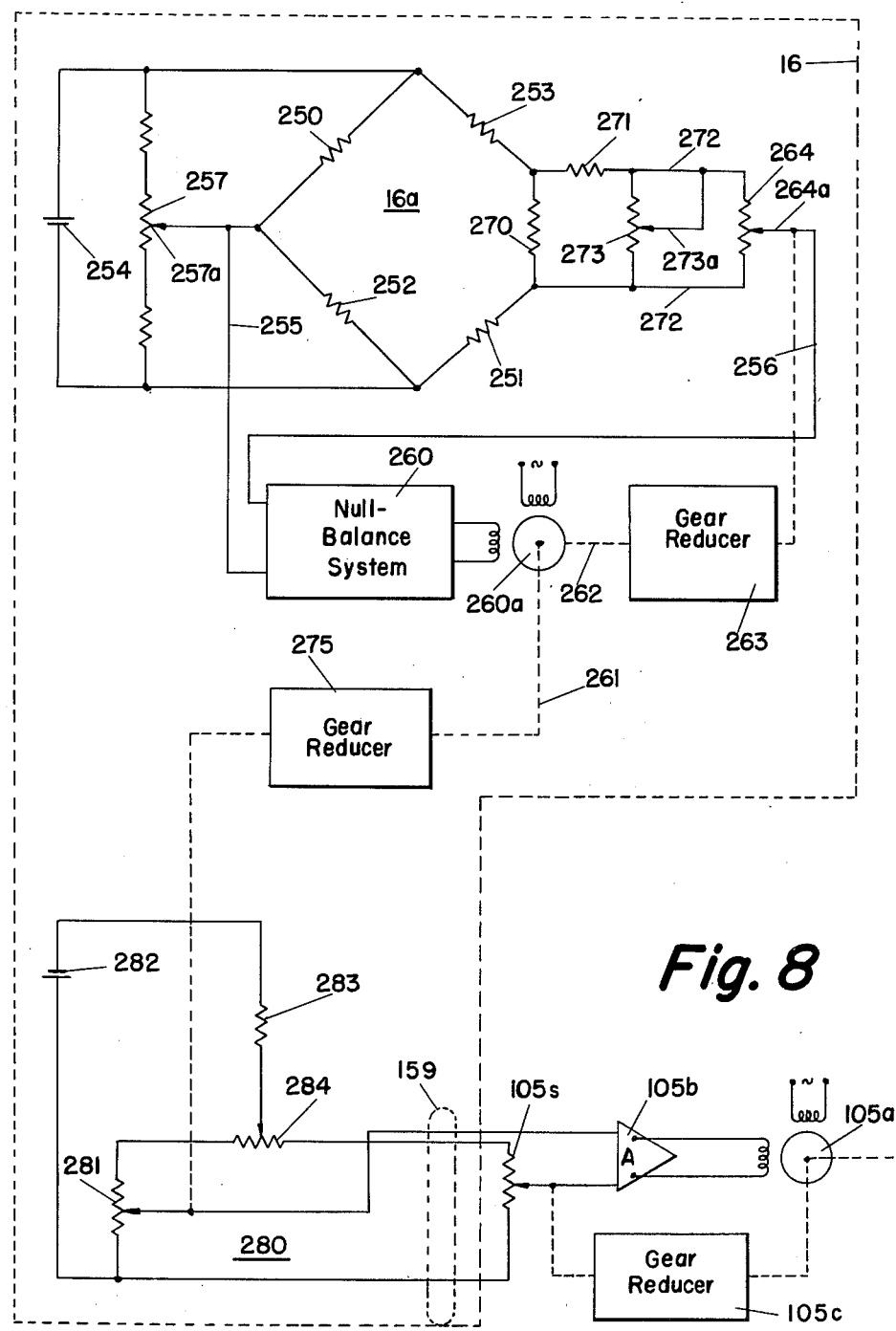
Figure 9:
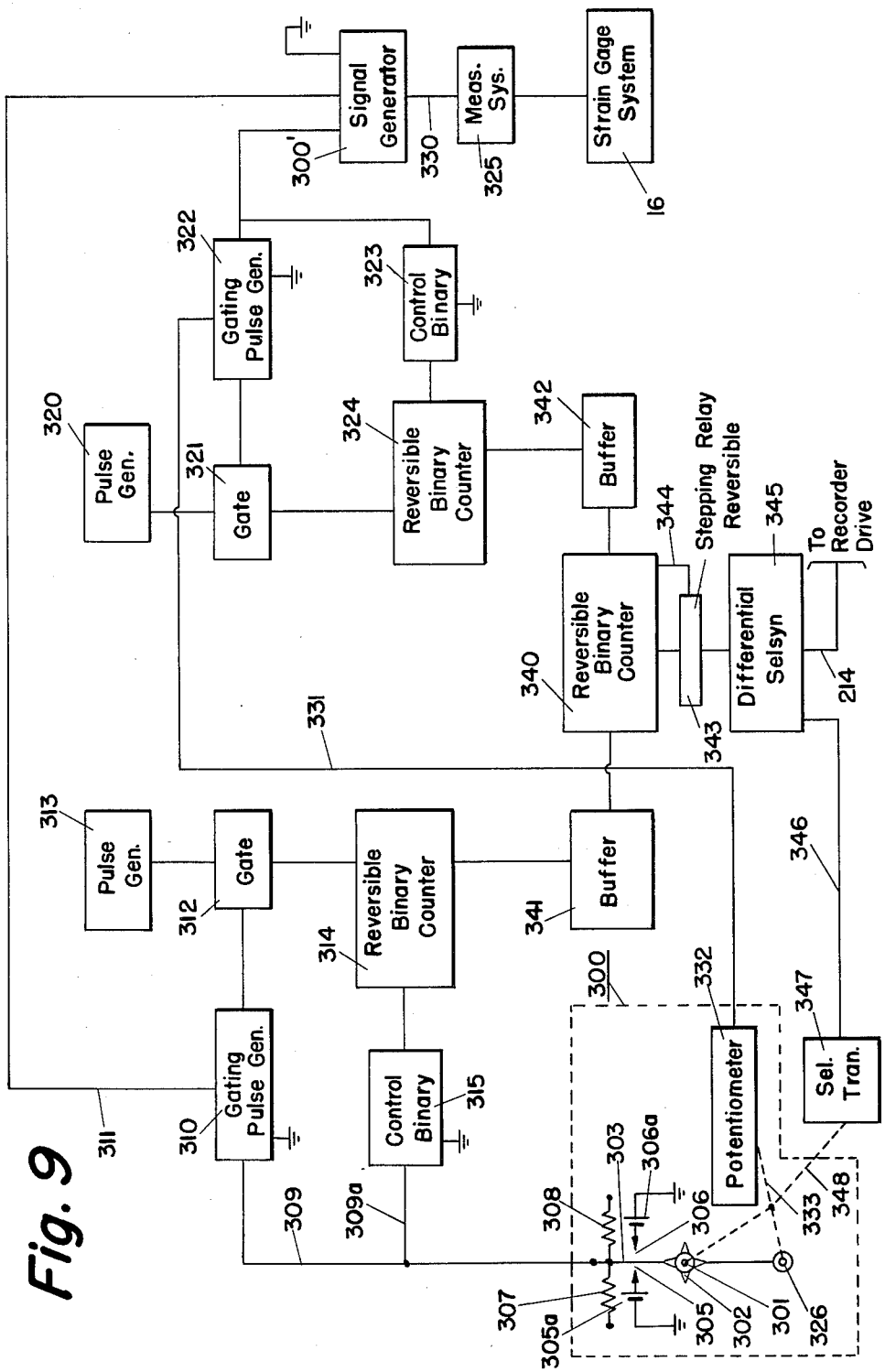
Figure 10:
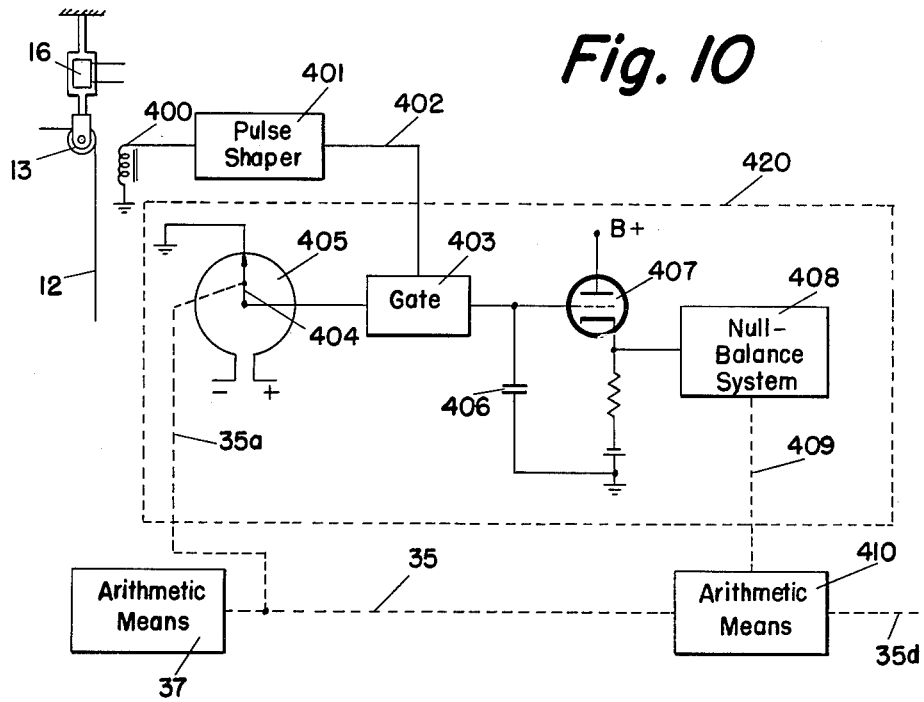
Figure 11:
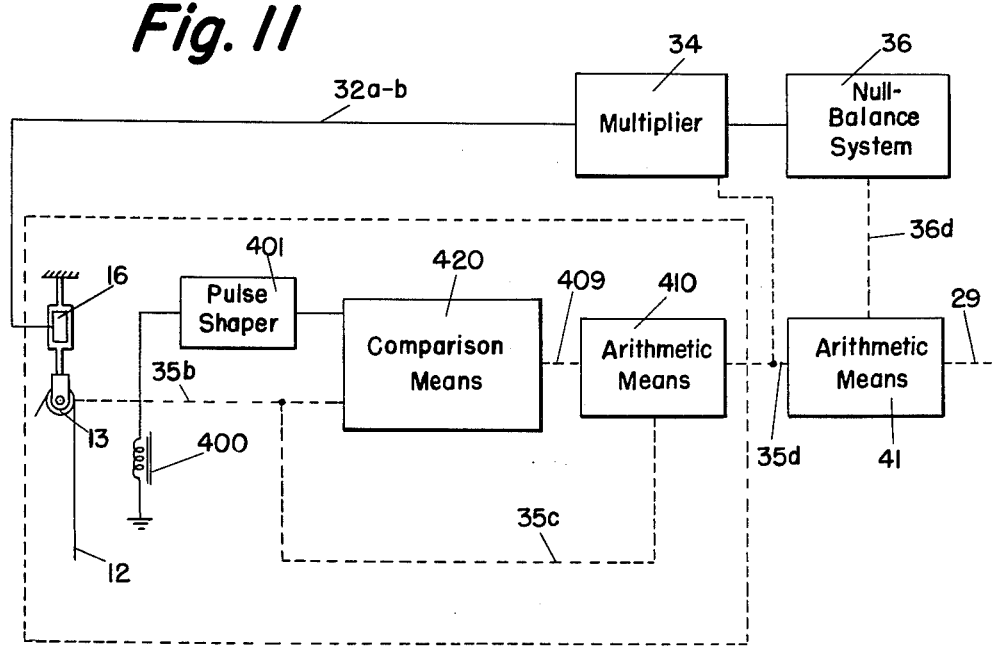

A system embodying the present invention, based upon the foregoing concepts, includes the measurement of the length of cable passing into and out of the well bore from a surface-measuring station. This measurement may be accomplished by means including a measuring sheave for generating a first function representative of the aforesaid length of cable. The tension on the cable at the measuring station is measured as by a strain-gage system to produce a second function. The manner in which the foregoing functions are utilized to provide an accurate indication of the position of the exploration unit in the well bore will be more readily understood by reference to the following detailed description including further objects and advantages of the invention, taken in conjunction with the accompanying drawings, wherein:

FIG. 1 schematically illustrates one embodiment of the present invention;

FIGS. 1A, 3 and 4 are schematic diagrams helpful to an understanding of the present invention;

FIG. 2 schematically illustrates a modification useful with the system of FIG. 1;

FIG. 5 schematically illustrates a further embodiment of the present invention;

FIGS. 6 and 7 schematically illustrate the preferred embodiments of the present invention;

FIG. 8 illustrates a strain gage detecting network useful in all embodiments for the measurement of the tension on the cable;

FIG. 9 schematically illustrates an electronic system embodying the present invention;

FIG. 10 illustrates a fractional part of FIG. 1 and, in particular, a corrective system applicable to FIG. 1 and to other modifications of the invention; and FIG. 11 illustrates a fractional part of the system which may be utilized in lieu of selected portions of other modifications of the invention.

Referring now to the drawings, and more particularly to FIG. 1, an exploration unit or logging tool 10 is illustrated at a substantial depth within a well bore 11. The tool 10 is supported by a cable 12 passing over an idler pulley 13 supported by stationary means 14 as through a connecting member 15, of steel, forming a part of a stress-measuring system 16 which includes one or more strain-gage elements. A typical strain-gage system 16, symbolically illustrated in FIG. 1, is shown schematically in FIG. 8 and will later be described in detail.

The position of the tool 10 in the well bore 11 is under the control of cable-reeling means 17 comprising a reel 17a and driving means therefor illustrated as a motor or prime mover 17b having a reversing lever 17c for rotating the reel in a forward or reverse direction. Between the reel 17a and the idler pulley 13 is a measuring sheave 18 which is pressed against cable 12 to form a positive drive therewith. To simplify the drawings, the mounting means for the measuring sheave 18 have been omitted. Instead of utilizing the sheave 18, the idler pulley 13 may be secured to its supporting shaft and this shaft utilized in lieu of the measuring sheave 18 to drive through mechanical connection 19, a shaft 20.

As explained above, it is desired to drive a position-indicating element such as the chart 21 of a recorder 22 in correspondence with movement of the tool 10. The chart 21 is driven in such a manner that a datum line 21a on the chart corresponding with the earth's surface is at a position, for example, corresponding with the transverse line of travel of a pen-index 23 of the recorder 22 when the tool 10 is also at the earth's surface. As the tool 10 is lowered and subsequently raised for the logging of the well bore 11, the chart 21 is driven to follow exactly the movements of the tool 10 so that longitudinal distances on the chart from the datum line 21a to the line of travel of pen-index 23 are at all times representative of the true position or depth of the tool 10 in well bore 11. Such a distance has been labelled $l_0$.

The pen-index 23 is driven by means of a null-balance system 24 responsive to electrical signals generated by the logging tool 10 and transmitted by way of conductors within the hoisting cable 12. These conductors terminate at slip rings 25. Through sliding contacts on the slip rings 25, and conductors 26, the output signals from the exploring unit 10 are applied to the control box 27.

Those skilled in the art are familiar with the variety of logging tools and exploration units currently used in the logging of well bores. As exemplary, the tool 10 may be of the type disclosed in Summers Patent No. 2,704,364, together with the associated uphole system of said Summers patent as indicated by control box 27. The null-balance system 24 including the recorder 22 may be of the type described in Williams Patents Nos. 2,113,164 and 2,367,746.

The control box 27 includes a system fully described in said Summers patent by means of which there is maintained across a capacitor 28 a potential difference representative of a selected characteristic of subterranean strata, such for example, as the velocity of acoustic energy therethrough. The null-balance system 24 provides a continuous measurement of the potential difference or voltage across capacitor 28. More particularly, when the voltage of capacitor 28 changes, there is applied to an amplifier 24a an input signal which applies to the control winding of a motor 24b alternating current of such phase (relative to that of its power winding) that it is energized to rotate in a direction to move a contact 24c of a slidewire 24d in a direction to reduce to zero the voltage applied to amplifier 24a. The slidewire 24d is energized as by battery in series with a rheostat. In this manner, there is a continuous null type of measurement of the voltage appearing across capacitor 28. The motor 24b drives one of the pulleys supporting a driving element or cord to position the pen-index 23 relative to the chart 21, and when desired, relative to an associated scale, not shown.

The position-indicating element comprising the chart 21 of recorder 22 may be driven directly from an output shaft 29, though, as illustrated, this shaft rotates a Selsyn transmitter 30 which, through its electrical connections with a Selsyn receiver 31, drives the chart 21 in exact correspondence with movement of the tool 10. As shown, the distance from the point of contact on the chart of the pen-index 23 to the datum line 21a illustrated at the lower end of the chart is representative of, the distance $l_0$ from the earth's surface to a selected point on the logging tool 10, e.g., to the upper surface thereof.

Before describing the manner in which the extent of rotation of the shaft 29 is controlled to be representative of the distance $l_o$, the construction and mode of operation of certain additional parts of the system will be explained. For example, the strain-gage system 16 at all times responds to the magnitude of the cable tension at the surface or at the mouth of the well bore, since the weight of the cable and tool is applied to the idler pulley 13 and to the steel member 15 forming its support. The strain in the steel member 15, which varies the output of system 16, is proportional to the cable tension. The strain-gage system 16 produces an output voltage which is applied to output conductors 32a and 32b. A voltmeter 33 connected across conductors 32a and 32b is calibrated in terms of, and from it may be read, the tension on cable 12. The magnitude of the tension in terms of the output voltage from the strain-gage system 16 is also applied to a slidewire 34 having a relatively adjustable contact 34a driven from a shaft 35. The voltage developed between conductor 32a and contact 34a is applied to a null-balance system 36 which includes an amplifier 36a, a potentiometer 36b, powered by a battery through a rheostat, and a balancing motor 36c. Upon change in the tension in cable 12, the voltage applied to the slidewire 34 changes. Assuming the contact 34a to be stationary, the amplifier 36a, in response to said change in voltage, energizes the control winding of the motor 36c in a direction which through the mechanical connection 36d adjusts contact 36e in a direction to rebalance the system, thus to reduce to zero the unbalance voltage as seen by the amplifier 36a. The purpose of driving the contact 34a from shaft 35 will be later explained.

The measuring sheave 18, or its equivalent, forms an important element of the present invention. It provides the generation of a function which is a measurement of the length of cable $l_m$ which passes by the sheave 18. This sheave-measured length, $l_m$, is transmitted by driving connection 19 to a shaft 20 which forms the input shaft to an arithmetic means 37 illustrated as a differential gear mechanism. The cage 37a of the differential mechanism 37 is driven from the splined output shaft 38 of an integrator 39, as indicated by the broken-line mechanical connection, and gears 40. The output shaft 35 of the arithmetic means 37 is the input shaft to a second arithmetic means 41, also shown as a differential gear mechanism. Its cage 41a is driven, through the illustrated gearing, by the motor 36c.

A gear 42 on shaft 20 forms with a gear 43 a speed reducer which by way of the broken-line mechanical connection rotates the disc 44 of the integrator 39. Though integrators of any of the conventional types may be utilized, as for example of the ball type, there has been illustrated an integrator of the wheel and disc type. The wheel 45 is driven by the disc 44 and it is slidable along splined output shaft 38. The wheel 45 is adjustably positioned radially of disc 44 by means of a travelling nut on a threaded shaft 48 by way of the mechanical connection 46. The shaft 48 is driven by a variable speed changer 47. The speed changer is shown as of the transmission type, though it may be of the continuously variable type. As shown, the gears 47a are in mesh. They drive the threaded shaft 48. The driving gear is driven by a motor 49c forming part of a null-balance system 49 and which includes an amplifier 49a, a potentiometer 49b, and an input slidewire 49d. The movable contact 49e of slidewire 49d is driven by the motor 49c through gears 50 which are representative of a speed-reducer. The input resistor in the form of the slidewire 49d is connected across the conductors 32a and 32b to be energized by a voltage representative of the tension of the cable 12 at the surface for reasons which will be later set forth.

With the foregoing explanation of the organization and operation of the component parts of the system of FIG. 1, attention will now be directed to the background theory and applicable equations, considering first an air-filled borehole.

It will be apparent from an inspection of the position of the exploration unit or tool 10 in borehole 11 that its true depth is equal to the distance $l_o$. If it now be assumed that the cable 12 is under a selected reference tension T', which is less than the average tension existing on the cable as appearing in FIG. 1, the logging tool 10 will be located below the surface a lesser distance, for example, a distance equal to $l'_o$. This distance is illustrated in FIG. 1 with the logging tool shown by dotted lines and labeled 10'. If $\Delta l_o$ be taken as the difference between $l_o$ and $l'_o$, then, $$l_o = l'_o + \Delta l_o \qquad (1)$$

Equation 1 is solved by the system of FIG. 1. Consistent with the foregoing reasoning, it is to be noted that the measuring sheave 18 can be utilized to determine $l_m$, defined as the length of cable which passes by the sheave 18. Therefore, $l_m$ is the value of the cable length measured by the sheave. If $\Delta l_m$ be taken as the difference between $l_m$ and $l'_o$, the equation for $l'_o$ becomes $$l'_o = l_m - \Delta l_m \qquad (2)$$

Substituting Equation 2 in Equation 1, there is obtained $$l_o = l_m - \Delta l_m + \Delta l_o \qquad (3)$$

Equation 3 is here set forth because all embodiments of the invention include a solution of this equation as well as Equation 1.

An expression for $\Delta l_o$, the difference between $l_o$ and $l'_o$, may be obtained by utilizing Hooke's law. Considering first a given length of cable extending horizontally in a straight line, there will be a change in length upon application thereto of tensional forces. If, for example, a predetermined tension be applied to the cable, it will elongate by a predictable amount which can be calculated by utilizing a stretch coefficient, K, for the cable. If, instead of the cable being stretched horizontally, it be considered as supported vertically and that the total weight of the cable be concentrated at the lower end thereof, the following equation for the change in length $\Delta l$ may be written.

$$\Delta l = K(T_o - T')l'_o \qquad (4)$$

where $K =$ the change in length per unit length of cable per pound of additional tension;
$T_o =$ total tension in pounds upon the cable as measured at the surface;
$T' =$ the reference tension in pounds; and
$l'_o =$ the length of the cable when under said reference tension.

The foregoing equation is not applicable to FIG. 1 for the reason that the total weight of the cable is not concentrated at the lower end thereof. In FIG. 1, the total tension, $T_o$, is equal to the weight W of the tool plus the product of the length $l'_o$ and the weight $w$ per unit length of the cable under the reference tension, or $$T_o = W + wl'_o \qquad (5)$$

The weight W of the tool 10 is applied at the lower end of the cable and is effective upon all incremental lengths of the cable from the lower end upwardly thereof. Beginning at the lower end of the cable, each incremental length above an adjoining incremental length supports that part of the cable below it, which is to say that the distribution of tension in the cable due solely to its weight increases from the bottom of the cable upwardly thereof. Assuming the increase in cable tension changes linearly with increasing distance from the lower end thereof, the change in length for the whole length of the cable will be equal to the change of half its length with the assumption that the total weight of the cable be applied to the cable midway thereof. Accordingly, $\Delta l_o$ can be expressed as follows:

$$\Delta l_o = K(W-T')l'_o + K\frac{l'_o}{2}wl'_o \qquad (6)$$

Equation 6 follows the form of Equation 4 with the right-hand side of Equation 5 used in place of $T_o$ and with $$\frac{l'_o}{2}$$

included in the final term pursuant to the foregoing discussion.

Though not an absolute requirement, as will later be shown, it is a feature of the present invention to select the reference tension $T'$ to be equal to $W$. With this assumption, it will be seen from an inspection of Equation 6 that the first term of the right-hand side of that equation reduces to zero. Accordingly, Equation 6 becomes $$\Delta l_o = K\frac{l'_o}{2}[wl'_o] \qquad (7)$$

Assuming now that the tool is at the surface as at the mouth of the well bore and that the short length of cable from the mouth to the supporting idler pulley 13 may be ignored, the only load which will then be upon the strain-gage system 16 will be due to the weight $W$ of the tool. If the strain-gage system 16 be now adjusted to have zero output, the effect will be the same as selecting the weight of the tool $W$ as equal to the reference tension $T'$. Thus, the first right-hand term, Equation 6, will be zero because the strain-gage system has been adjusted to read zero; and the second right-hand term will be zero because of the assumed zero length of cable.

As the tool is lowered into the borehole, the cable passes over the idler pulley 13 and its length increases. The tension developed on the cable at the surface, as noted above, is equal to $wl'_o$. This is the tension $T_m$ to which the strain-gage system 16 responds, that is, its output $T_m$ is proportional to $wl'_o$. Accordingly, rewriting Equation 7 and substituting $T_m$ for $wl'_o$, there is obtained:

$$\Delta l_o = \frac{K}{2}l'_o wl'_o = \frac{K}{2}T_m l'_o \qquad (8)$$

An inspection of Equation 8 reveals the fact that $\Delta l_o$, the last term of Equation 1, has been expressed in quantities measurable at the surface. Attention will now be given to the term $l'_o$ of Equation 1.

Since for the dynamic case, the tool 10 is to be raised or lowered in the well bore 11, the measured tension $T_m$ and lengths $l_m$, $l'_o$, and $\Delta l_m$ will be changing. It will be convenient, therefore, to adopt the mathematical notation of $t_m$, $x_m$, $x'_o$ and $\Delta x_m$ respectively to indicate the changing values of $T_m$, $l_m$, $l'_o$ and $\Delta l_m$ before attainment of their final values.

From Hooke's law, the following equation may be written in terms of incremental changes in $x_m$, and defined as $dx_m$. Similarly, $dx'_o$ will refer to incremental changes in $x'_o$. Accordingly, $$dx_m = (1+Kt_m)dx'_o \qquad (9)$$

Integrating, $$\int_0^{l_m} dx_m = \int_0^{l'_o}(1+Kt_m)dx'_o \qquad (10)$$

And $$\int_0^{l_m} dx_m = \int_0^{l'_o} dx'_o + \int_0^{l'_o} Kt_m dx'_o \qquad (11)$$

But $$\int_0^{l_m} dx_m = l_m \qquad (12)$$

And $$\int_0^{l'_o} dx'_o = l'_o \qquad (13)$$

So, rewriting Equation 11

$$l_m = l'_o + \int_0^{l'_o} Kt_m dx'_o \qquad (14)$$

Solving Equation 9 for $dx'_o$ $$dx'_o = \frac{dx_m}{1+Kt_m} \qquad (15)$$

and substituting the right-hand side of Equation 15 for $dx'_o$ in Equation 14, there is obtained:

$$l_m = l'_o + \int_0^{l_m}\left(\frac{Kt_m}{1+Kt_m}\right)dx_m \qquad (16)$$

Since in Equation 16 incremental changes $dx_m$ appear (instead of $dx'_o$), the limits are taken from 0 to $l_m$ to correspond with $dx_m$.

Solving Equation 16 for $l'_o$ $$l'_o = l_m - \int_0^{l_m}\left(\frac{Kt_m}{1+Kt_m}\right)dx_m \qquad (17)$$

Since $l'_o$ has now been expressed in quantities measurable at the surface, Equation 1 may again be used, substituting the right-hand side of Equation 17 for $l'_o$ and the right-hand side of Equation 8 for $\Delta l_o$, $$l_o = l_m - \int_0^{l_m}\left(\frac{Kt_m}{1+Kt_m}\right)dx_m + \frac{K}{2}T_m l'_o \qquad (18)$$

Before describing how the system of FIG. 1 provides a solution of Equation 18, a comparison of Equation 18 with Equation 3 is invited. By inspection, it will be seen that the second right-hand term of Equation 18 is equal to $(-\Delta l_m)$, or $$-\Delta l_m = -\int_0^{l_m}\left(\frac{Kt_m}{1+Kt_m}\right)dx_m \qquad (19)$$

Thus Equation 18 when solved also represents a solution of Equation 3.

In accordance with FIG. 1, $l'_o$ is determined in terms of Equation 17 and as a function of the rotation of output shaft 35. In FIG. 1, $l'_o$ is then added to $\Delta l_o$. In FIGS. 5–7, the quantity $(\Delta l_o - \Delta l_m)$, pursuant to Equation 3, is added to the quantity $l_m$ in determination of the location or depth, $l_o$, of tool 10 in well bore 11.

Both from a mathematical standpoint and from a practical standpoint, the present invention comprehends the determination of the true depth in terms of three functions or factors. The first is the measured length, $l_m$, of the cable. The second is in terms of $\Delta l_m$ and the third is $\Delta l_o$. These three terms are algebraically added with the sign of $\Delta l_m$ opposite to the signs of $l_m$ and $\Delta l_o$. The order of addition is unimportant. As shown in FIGS. 5–7, there are added $(\Delta l_o)$ and $(-\Delta l_m)$ while as will now be demonstrated, in FIG. 1, $l_m$ is first algebraically added to $(-\Delta l_m)$, Equations 2, 17. The term $\Delta l_o$ is then added to $l'_o$, Equations 1 and 18 for determining $l_o$.

The system of FIG. 1 provides a solution for Equation 18 and in the following manner. The function representative of the measured length $l_m$ is applied to the shaft 20 by the sheave 18. By means of the gear 43, there are taken from the shaft 20 the incremental changes $dx_m$ in $l_m$. These changes $dx_m$ are applied to the disc 44 of the integrator 39. The wheel 45 of the integrator 39 is positioned in accordance with a function representative of $$\frac{Kt_m}{1+Kt_m}$$

The mathematical proof of the foregoing will later be indicated. Stated differently, the output from the integrator is a function representing $$\int_0^{l_m}\frac{Kt_m}{1+Kt_m}dx_m$$

The result of the integration is a function applied by way of the shaft 38 and gear 40 to the cage of the differential mechanism or arithmetic means 37. Through the arithmetic means, the result of the above-indicated integration is subtracted from the measured length $l_m$. Accordingly, the rotation of the output shaft 35 is a function representative of a solution of Equation 17, which is $$l'_o = l_m - \int_0^{l_m} \frac{Kt_m}{1+Kt_m} dx_m \qquad (17)$$

The length $l'_o$ as represented by the rotation of shaft 35 appears on an indicator 55 shown in the form of a revolution counter.

The system having provided a solution for $l'_o$, now adds to it, $$\Delta l_o = \frac{K}{2} T_m l'_o$$

This is done as follows. The voltage representative of the measured tension, $T_m$, from the strain-gage system 16 is applied to the slidewire 34 and its contact is adjusted in accordance with the rotation of shaft 35 representative of $l'_o$. By means of the amplifier 36a (forming a part of the self-balancing system), the motor 36c is energized for rotation by an amount proportional to the product, the last term of Equation 18. Through gearing the cage of the differential or arithmetic means 41 is driven by motor 36c algebraically to add $\Delta l_o$ to the rotation of shaft 35.

Thus, the rotation of shaft 29 is representative of the desired output in terms of $l_o$, or Equation 1, of $l'_o + \Delta l_o$. The shaft 29 may drive directly the chart 21 of the indicating and recording mechanism 22 so that the distance from the datum line 21a will at all times be representative of the true depth $l_o$ of the tool 10 in well bore 11. It will be remembered, however, that the Selsyns 30 and 31 form a convenient driving link to provide for a remote location of the recorder 22 from the shaft 29. A revolution counter 56 for shaft 29 provides an additional indicator of the true depth $l_o$ of the tool 10 in well bore 11.

Assuming now that the gear ratios have been selected to take care of a well bore of depth at least as great as the well bores for which the system of FIG. 1 is to be utilized, the operation as a whole will now be set forth with particular attention directed to the manner of providing a solution for Equation 18. It will be further assumed that the tool 10 is located at its zero position at the surface or at the mouth of the well bore 11. With the tool 10 at the mouth of the well bore 11, the wheel 45 of integrator 39 will be moved to the exact center of the disc 44. This may be conveniently done by operating the lever 57 to disengage the gears 47a. The shaft 48 is then rotated to bring the wheel 45 to the center of disc 44.

As indicated above, the output of the strain-gage system 16 is adjusted to be zero with the tool 10 at the mouth of the well bore. At the same time, the movable contact 34a, if not at, will be moved to, its zero position, as for example, in a position making direct connection to the conductor 32b. The cable-reeling means 17 is then brought into operation by control lever 17c to pay out the cable over the idler pulley 13 to lower the tool 10 into the well bore 11. The measuring sheave 18 immediately produces rotation of shaft 20. The rotation of shaft 20 is representative of the first term of Equation 18, namely $l_m$.

Upon downward movement of the tool 10, there will be an output from the strain-gage system 16 which is a measuring function applied to the resistor 49d as well as to resistor 34. The detector, including the amplifier 49a and the motor 49c, provides a null-type measurement of the voltage developed across that fraction of resistor 49d labeled $R_1$. The output of the motor 49c (with the gears 47a again in mesh) positions the wheel 45 in accordance with the fraction appearing in parentheses in the second right-hand term of Equation 18. The output of motor 49c in terms of its rotation is representative of the fraction forming part of the integral term of Equation 18 by reason of the feedback from motor 49c through gears 50 to position the contact 49e of resistor 49d. Though the mathematical proof will be later set forth, it is here sufficient to say that the gears 50 in moving contact 49e to reduce the value of $R_1$ so modify the response from the strain gage system 16 as to produce an output corresponding with relationship $$\frac{Y}{1+Y}$$

This will be recognized as the same in form as $$\left(\frac{Kt_m}{1+Kt_m}\right)$$

The stretch coefficient K is a constant and it is taken into account by the selection of the constants of the system, as for example, the setting of the rheostat in series with the battery of potentiometer 49. The constant K also may be taken into account by the gear ratio selected for gears 47a.

From the foregoing, it will be seen that the concurrent rotation of the disc of the integrator 39 and the movement of wheel 45 produce an output by way of the splined shaft 38 for application through the gears 40 to the cage of the arithmetic means 37 of a corrective function representing the integral term of Equation 18. In this connection, it is to be noted the gear ratio for gears 42 and 43 preferably will be such that for each revolution of the shaft 20, the gear 43 and disc 44 will be rotated an amount so that in conjunction with the rotation of the wheel 45, every revolution of shaft 38 will introduce a correction corresponding with one foot. This, of course, determines the gear ratio of the gears 40 with respect to the cage 37a of the arithmetic means 37 so that for each revolution of the lowermost gear of gears 40, the arithmetic means 37 will introduce the same one foot correction for the output shaft 36. The rotation of the cage 37a of the arithmetic means 37, corresponding with $(-\Delta l_m)$, is such that the corrective factor introduced is of sign opposite to $(l_m)$, the rotation of shaft 20.

Concurrently with the foregoing, an output function representative of the increasing tension on cable 12 is generated in the form of a rising voltage applied to the resistor 34 which unbalances the measuring circuit 36 for energization of the motor 36c in a direction to drive the cage 41a in a direction opposite to the movement on cage 37a for addition of $\Delta l_0$, the last term of Equation 18 to the output $l'_o$ represented by rotation of shaft 35. Thus, by subtraction of the second term of Equation 18 by arithmetic means 37 from the first right-hand term $l_m$ and by the subsequent addition to the result $l'_o$, the shaft 29 is driven so that the scale on the chart 21 from the datum line 21a is at all times representative of the true position of the tool 10 within the well bore. The rotation of the shaft 29 at all times produces on the chart 21 a change in $l_o$ corresponding with each change of position of tool 10.

In the foregoing brief description, there has been neglected the drag or frictional forces, and no mention has been made of the presence or absence of liquid or drilling mud within the well bore. For the following description, it will be assumed that there is absent in the well bore 11 any drilling fluid and mud so that there can be ignored any buoyant forces either on the cable 12 or on the tool 10. However, the drag forces due to frictional engagement of the tool 10 and of the cable 12 will be present, and as already noted, these drag forces will always act in opposition to the forces which produce movement of tool 10. Thus, as the tool 10 is being lowered into the well bore 11, the tension on cable 12 as measured by the strain-gage system 16 is made less by the magnitude of the drag forces which act in opposition to movement of cable 12 and tool 10. The drag forces are effective in the region of the tool 10 and also lengthwise of the cable. Since the length $l_o$ is ordinarily substantial, the cable will extend through a relatively large length of the well bore. It is for this reason that it may be assumed that frictional or drag forces will be developed all along the cable due to its contact with the walls of the well bore. This concept, closely approximated in the practice of the invention, justifies the assumption that the drag forces acting on the cable above its mid-point will be of magnitude corresponding with the drag forces acting on the cable below its mid-point. As a result, the change in the response of the strain-gage system 16 due to the drag forces accurately reflects their effect upon the cable throughout its length in changing the tensional forces which give rise to the stretch and so to the disparity between $l_m$ and $l_o$. The manner in which the system functions to compensate for the presence of the drag forces (and as will later be explained for buoyant forces) will now be set forth.

Continuing the assumption that the tool 10 is moving downwardly of the well bore 11 and that the control lever 17c is actuated slowly to bring to standstill the reeling means 17, the tool 10 will decrease its rate of descent. As the tool 10 approaches standstill, the upwardly acting drag forces decrease in magnitude, reaching zero as a limit when the tool 10 is at standstill. Thus, as the operation of measuring sheave 18 will reflect a decreasing speed with which the cable 12 is moving into the well bore 11, the output of the strain-gage system 16 will be increasing. It will be increasing because of the gradual removal of the upwardly directed drag forces. The removal of upwardly directed drag forces has the same effect on the cable as increasing the weight thereof. The foregoing means that as the cable 12 is brought to standstill at the measuring sheave 18, the downhole portion thereof continues to stretch until the drag forces have been reduced to zero.

For convenience in explaining the foregoing in terms of Equation 18, it will be assumed that the reeling means 17 has come to standstill and that the measuring sheave 18 has likewise come to standstill and before the drag forces have disappeared on the cable 12 and upon the tool 10. With the sheave 18 at standstill, the shaft 20 will be at standstill and, accordingly, the disc 44 of integrator 39 will be at standstill. This means that there will be no output from the shaft 38 to drive the cage 37a of the arithmetic means 37. Since the first two right-hand terms of Equation 18 are equal to $l'_o$, which represents the length of the cable in the well bore under a reference tension, it will be seen that the first two right-hand terms of Equation 18 are satisfied by the assumed conditions of operation. However, as the drag forces disappear, the strain-gage system 16 responds to the increased tension on the cable 12 and thus increases the voltage applied to the resistor 34. Accordingly, the amplifier 36a responds and energizes the motor 36c for rotation of the cage 41a to drive the shaft 29 by an amount representative of $\Delta l_o$, equal to the last right-hand term of Equation 18. Thus, the chart 21 will be positioned accurately to indicate the continued movement of tool 10 and to show at all times the position of tool 10 within the well bore in terms of the true length $l_o$.

If it now be desired to conduct an uphole survey of well bore 11, the reeling means 17 through lever 17c will be actuated to take in cable. Because of the presence of the drag forces opposing movement of tool 10 and of cable 12, the tool 10 will not move with initial rotation of the reeling drum 17a. The tool 10 will not move until the upwardly directed force on the cable 12, as reflected by the output of the strain-gage system 16, exceeds the weight of the cable and of the tool 10 plus the drag forces. Under the assumed conditions, the tool 10 will be stationary while the sheave 18 will be moving. The shaft 20 will be correspondingly rotated by sheave 18 to drive the disc 44 of integrator 39. At the same time, the balanceable system 49 will be positioning the wheel 45 of the integrator. There will be rotation of shaft 35 since $l'_o$ will be changing. The length $l'_o$ that the cable would have, if under the reference tension, is decreasing because the reeling means 17 is withdrawing cable from the well bore 11. With a lesser amount of cable within the well bore 11, the length when under a reference tension will correspondingly decrease. Since the tool 10 so far has remained at standstill, $l_o$ has not changed. Consequently, with $l'_o$ decreasing, $\Delta l_o$, Equation 1, is increasing, and by the same amount. As the tension on cable 12 continues to increase, the voltage applied to the resistor 34 continues to increase, and the balanceable system 36 continues to be unbalanced for energization of motor 36c to drive the cage 41a in a direction and by an amount exactly to counteract the rotation of shaft 35, thus to produce zero output of shaft 29. Accordingly, so long as the tool 10 is at standstill, the shaft 29 is at standstill, and the position of chart 21 continues accurately to represent the position of tool 10 within well bore 11. As soon as tool 10 moves, so does the chart 21; the operation then continues as above described.

Now that the operation under the two extreme conditions of operation have been explained together with the manner in which the system of FIG. 1 provides for a solution of Equation 18, it will be understood that the system functions at all times to drive the chart 21 and the indicator 56 correctly to provide accurate measurement of the position of tool 10 within well bore 11. In this connection, reference is made to FIG. 1A where true depth is represented by ordinates and recorded depth by abscissae. The graph A is a straight line inclined downwardly. As shown, it is inclined downwardly at 45° to illustrate a one-to-one relationship between recorded depth and true depth. Were it possible to lower the tool 10 within the well bore 11 at constant velocity, the measuring sheave 18 can be arranged accurately to indicate depth. The difficulty is that the tool 10 is not moved at constant velocity in the logging operations of well bores. The customary field practice is to move the tool 10 at relatively high velocity to the sub-surface location where the substrata are likely to be of greatest interest. As such locations are approached, the movement of the tool 10 will be greatly slowed down, and its speed or velocity may be further adjusted from time to time in order to produce on the chart 21 a record of maximum clarity in terms of the characteristics of the sub-surface formations being studied, as for example, the acoustic velocity thereof.

From these considerations, it will be noted that in FIG. 1A the broken line curve B may be taken as representative of the movement of the tool 10 at constant velocity down the borehole—not for the purpose of representing field conditions—but for the purpose of illustrating what has already been said in respect to what happens as a change in velocity occurs. As the tool 10 approaches a true depth indicated at $a$ and likewise representing when the tool has been brought to standstill, the sheave 18 likewise will be at standstill and the "Recorded Depth" will be shown in FIG. 1A. However, the "Recorded Depth" under such conditions is not the true depth because as the tool 10 comes to standstill, the cable 12 stretches and the tool 10 moves downwardly to the point $b$. The error in the sheave measurement is the distance between $a$ and $b$ on the "True Depth" scale. If now cable 12 is taken in by the reeling means 17 to raise the tool 10, there is immediate movement of the sheave 18 which shows up as a change in recorded depth as, for example, from $b$ to $c$ but without any change in position of the tool. Thus, there are two errors resulting from the use of the sheave alone, the second occurring prior to the movement of the tool 10 upwardly of the borehole and thereafter as represented by the broken line $B_1$.

Further, in connection with the graph or broken line $B_1$, it is to be noted that it has been extended to its intercept with the ordinate and that when the "Recorded Depth" is indicated as zero, curve $B_1$ indicates the true depth as downwardly of the mouth of the borehole. From all of the foregoing considerations, it will be seen why sheave measurements have such limited application, and likewise the importance of the present invention in providing accurate indications at all times of the true depth or position of the logging tool 10 within the well bore 11.

In accordance with the present invention, zero depth will be indicated on the chart 21 when the tool arrives at the surface and by reason of a correction which has been introduced equal to the distance from the origin to the point $d$ of FIG. 1A. In order for this correction to have been produced, the integrator 39 and the function generators 34—34a will have both been effective in the manner already described. Wheel 45 will be in a position displaced from its origin at the center of the disc 44, and the movable contact 34a will be displaced from its point of origin in contact with conductor 32b. Accordingly, for a second logging operation, the initial adjustments above-described will be made to move the wheel 45 to the center of disc 44 and to move the contact 34a to its zero position.

There will later be described modifications which include provisions which make unnecessary repositioning of contact 34a and of the wheel 45 relative to the disc 44 regardless of the number of runs between the surface and selected depths of the well, and particularly in respect to repeated upward and downward logging operations of selected lengths of the well bore.

*Well Bore Filled With Liquid*

Before describing the additional modifications, attention will now be directed to the modification of FIG. 1 as applied to the logging of well bores which are partially filled with liquid, a term herein used to include the presence or absence of drilling mud. If the well bore 11, for all practical purposes, be filled with liquid, the tool 10 and the cable 12 will be moving through a medium of uniform density similar to the condition existing when the well bore is filled with air. With the tool 10 and cable 12 moving through a medium of uniform density, the system of FIG. 1 will function as described above with the following initial adjustment thereof. Instead of adjusting the strain-gage system 16 to have zero output with the tool 10 suspended in air, the tool 10 will be suspended just below the surface of the liquid. The strain-gage system 16 will then be adjusted to have zero output. This provides a different reference tension, one equal to the weight of the tool in the well bore liquid, the strain-gage system 16 thereafter responding to the measured tension $T_m$, as before. Utilizing the reference tension $T'$ as equal to the weight of the tool in the liquid, no further corrections will be necessary. The system of FIG. 1 will then provide an accurate measurement of the true position or depth of the tool within the well bore since the strain-gage system automatically takes into account the buoyant forces on the cable. Though the output of strain-gage system 16 can be adjusted in other ways, as will be explained in connection with FIG. 8, there has been illustrated in FIG. 1 a resistor 32c in series with conductor 32b for the purpose of zeroing the strain-gage system 16 and for effectively bringing into the operation a computation of $l'_0$ corresponding with any selected reference tension. Thus, with the tool 10 immersed in the liquid within the well bore 11, a switch 32d is closed and a rheostat 32e adjusted until the current flowing through the resistor 32c from battery 32f has a value which produces a potential difference equal and opposite to that of the strain-gage system 16. This effectively zeroes the strain-gage system with the tool 10 immersed in the liquid.

It is not necessary to utilize a reference tension equal to the weight of the tool in the liquid. The previously utilized reference tension, equal to the weight of the tool in air, will be satisfactory even though the well bore be filled with liquid, providing a correction be introduced. The manner in which this correction is introduced and the determination of its magnitude will now be set forth in connection with FIG. 2 which is a partial reproduction of FIG. 1 with additions thereto.

Assuming that the well bore 11 is substantially filled with liquid and that the strain-gage system 16 has been zeroed with the tool 10 suspended in air, it will be understood that as the tool 10 is lowered below the surface of the liquid, buoyant forces will be effective both to make the effective weight of the tool and the effective weight of the cable less than their respective weights in air. It is for this reason that Equation 6 is not applicable to the condition where the well bore is filled with liquid. However, Equation 6, taking into account the buoyant forces, can be rewritten as follows:

$$\Delta l_o = K(W - W_d - T'')l'_o + K\frac{l'_o}{2}(w - w_d)l'_o \quad (20)$$

where $W_d$ = the weight of liquid displaced by the tool, and
$w_d$ = the weight of the liquid displaced per unit length of cable.

Since the reference tension $T'$ is again assumed to be equal to the weight of tool in air, Equation 20 can be rewritten, it being noted that the first right-hand term thereof does not now become zero as occurred in rewriting Equation 6 with the same assumption, but instead has a finite value. Rewriting the equation, $$\Delta l_o = -KW_d l'_o + K\frac{l'_o}{2}(w - w_d)l'_o \quad (21)$$

The system for FIG. 1 does not compute $\Delta l_o$ in accordance with Equation 21. It does not provide a solution for Equation 21 since the output of the balanceable system 36 includes provision for the fraction of one-half which appears in the right-hand terms of Equations 6 and 8. However, the change in the measured tension as applied to the balanceable system 36 will be effective to provide a solution for the last right-hand term of Equation 21, but because of the provision for the fraction of one-half, the solution for the first right hand term of Equation 21 will be decreased by an amount equal to $$\frac{K}{2}W_d l'_o$$

Thus, the system of FIG. 1 will introduce an error equal to the foregoing expression. This error may be readily corrected by provisions in FIG. 1 more particularly illustrated in FIG. 2. Referring now to FIG. 2, it will be remembered that the rotation of the shaft 35 is representative of $l'_o$. Since the factor $$\left(\frac{K}{2}W_d\right)$$

is essentially a constant for any given well, gears may be selected with a gear ratio for producing the desired multiplication of the aforesaid factor and $l'_o$. Thus, assuming a clutch 60 has been engaged, the gears 61 turn the shaft 62 in accordance with $l'_o$. The gear ratio between gears 63 introduces the aforesaid factor for rotation of the shaft 64 in accordance with the product of $$\frac{K}{2}W_d l'_o$$

The correction is applied by way of shaft 64 and a gear 65 to the cage 66 of an arithmetic means 67 to modify the output of shaft 53a and to produce a rotation of shaft 53b with the aforesaid correction applied. The shaft 53b can be connected directly to drive the chart of the recorder 22. It has not been illustrated as driving that chart because in FIG. 2, provisions have been made also to introduce a correction which will be needed in cases where the level of liquid in the well is at a distance materially below the surface and sufficiently far as to make the weight of the cable in air a significant factor prior to the entry of the tool into the liquid.

Inasmuch as the conditions above the level of the liquid and below the level of the liquid are now to be considered, the mathematical approach will follow that applied to Equation 4 et seq. More particularly, the distance S is taken as from the surface to the level of liquid. If now a point P on the cable be selected at the actual level of the liquid and it be assumed that the reference tension be applied to the cable 12, that point on the cable will move upwardly. The distance from the surface to the new position P' of the point on the cable will be S'. The difference between S and S' will be ΔS. The notations $l_o$, $l'_o$ and $\Delta l_o$ for lengths or distances in FIG. 2 are the same as in FIG. 1.

By reason of the fact that a part of the cable 12 is immersed in liquid, the tension on that part of the cable above the level of liquid due to the length of cable immersed in the liquid will be decreased. The reduction in the weight of the cable will amount to $w_d(l'_o-S')$. This reduction in weight reduces the stretch of the cable above point P' by an amount $Kw_dS'(l'_o-S')$. Implicit in the foregoing is the assumption that the reduction in the weight of the cable due to the length thereof below the surface of the liquid is a reduction effective at the selected point P' on the cable.

Because of the buoyant forces on the cable below the surface of the liquid, there will be a decrease in the cable weight for the submerged length of cable and a decrease in the stretch of the cable over and above what would occur in an air-filled well bore. The buoyancy forces which are effective upon the immersed length of the cable will depend upon the length of cable immersed in the liquid. These buoyancy forces are distributed along the length of the cable and thus affect the stretch in terms of incremental lengths of the cable. These forces may be considered to be linearly distributed and, therefore, the decrease in the length of the cable below the surface of the liquid may be written as $$\frac{K}{2}w_d(l'_o-S')(l'_o-S')$$

Since the strain-gage system responds to the tension on the cable whether in air or immersed in liquid, change in that tension due to partial immersion in liquid is reflected in the measurement. Remembering that the balanceable system 36 of FIG. 1 includes a fraction of ½ in the computation, it will be noted that that system will automatically compensate for the factor $$\frac{K}{2}w_d(l'_o-S')l'_o$$

but it fails by the fraction of ½ to compensate for the factor $Kw_dS'(l'_o-S')$ which is equal to to the reduction in the stretch of the cable over the length S'. Accordingly, it is necessary to introduce a correction equal to one-half of the last-named quantity, and this is conveniently done by taking from the shaft 35 as by gears 70 an output representative of $l'_o$ which, when a clutch 71 is engaged, operates through the gear ratio of gears 72 to perform the indicated multiplication of the aforesaid factor by ½ to apply through gear 73 to the cage of an arithmetic means 75 a correction. Thus, the rotation of shaft 53b is additionally corrected so that the rotation of the output shaft 53c driving the indicator 56 and the chart of recorder 22 will be representative of $l_o$, the true depth of the tool 10 in well bore 11.

In the above description of the two corrective systems, it was assumed that the clutches 60 and 71 were engaged. They will be engaged with the tool 10 in the illustrated position in FIG. 2. If it be assumed that the tool 10 is at the mouth of the well bore and is being lowered therefrom, the clutches 60 and 71 by suitable control mechanisms 76 and 77 will be disengaged. Both clutches will be disengaged since no corrections are necessary so long as the tool 10 is traveling in the air-filled portion of the well bore. For velocity logging, there will not be an output from the logging tool 10 so long as it is in air. In order to accomplish the velocity logging, it is necessary that the transducers thereof be coupled to the adjacent formations through a liquid medium. Consequently, their response provides a convenient indication of the location of the liquid level within the well bore. As soon as coupling is established between the transducers and the adjacent formations, there will be an output, and the pen indicator 23 of the recorder 22 of FIG. 1 will be moved to a position corresponding with the output of the measuring system 24. Thus, as soon as there is an output, it will be known that the tool 10 is at least partially submerged. It will have arrived at the level of the liquid. At this point, the actuating mechanisms 76 and 77, which may be solenoids, are operated to engage the clutches to make effective the corrective systems so that the output shaft 53c continues to function accurately to produce movement of the chart 21 in accordance with the true depth $l_o$ of the tool 10 in the well bore 11.

It may be noted that in the mathematical derivation, the prime system was utilized. It was utilized since the output of shaft 35 for $l'_o$ is in the prime system. Insofar as the mathematical expressions are concerned, it will be observed that they introduce differences, i.e., $l'_o-S'$. The difference between $(l'_o-S')$ and $(l'_o-S)$ is ΔS, and it can be shown that for conditions producing a maximum value of ΔS, for example, a 10,000 ft. well with a liquid level at 5,000 ft., ΔS is so small that the use of the distance S is entirely justified; more particularly, the foregoing system using the distance S will be accurate to within 0.0175 ft. This is a wholly negligible error.

Further, in connection with the corrective system including the gears 63, reference may be had to FIG. 3 where the graph 78 is plotted with well bore depth as abscissae and correction in feet as ordinates. Since there will not be any displaced liquid by the tool so long as it is moving in air, $W_d$ will be zero until the tool enters the liquid within the well. When it enters that liquid as at a well bore depth S, there should be a correction in feet corresponding with the point Q on graph 78. For the depth S, $l'_o$ can be read from the counter 55. As already noted, $$\frac{K}{2}W_d$$

is essentially a constant and is known for the particular well being logged. Hence, the correction $$\frac{K}{2}W_dl'_o$$

may be computed. As soon as this computation is made, the knob 80 is rotated until the computed correction appears on the counter 79, the knob 80 being effective through gears 81 to drive gears 63 and shaft 64. When the correction equal to the value of point Q appears on counter 79, the shaft 64 through gear 65 will have rotated the cage 66 of arithmetic means 67 to introduce the correction into the system for a new position of shaft 53b. In accomplishing the foregoing, the knob 80 rotates shaft 62 by an amount corresponding with $l'_o$. During the foregoing adjustment, the tool 10 will be at standstill. After the correction has been introduced, the mechanism 76 will engage the clutch 60. Thereafter, the correction will be introduced as indicated by the graph 78 to the right of the point Q.

At the time the clutch 60 is engaged, the actuating mechanism 77 will likewise be effective to engage clutch 71 for the introduction of the correction illustrated by the graph 82 which, it will be noted, also begins at the depth S.

FIG. 5.—$(\Delta l_o - \Delta l_m)$ Determined

It is to be remembered that in the discussion of FIG. 1, reference was made to the fact that the second right-hand term of Equation 18 was equal to $\Delta l_m$. While in the system of FIGS. 1 and 2, $\Delta l_m$ was combined with $l_m$ to produce an output equal to $l'_o$, it was noted that $\Delta l_m$ could first be combined with $\Delta l_o$ and the difference between these two terms then algebraically added to $l_m$ in order to determine the true depth $l_o$ of the tool 10 in the well bore 11. Such a system is shown in FIG. 5.

In FIG. 5, corresponding parts have been similarly numbered. However, it will be observed that changes have been made in the balanceable system which positions the wheel 45 relative to the disc 44 of integrator 39. The balanceable system 85 of FIG. 5 is simpler than that of FIG. 1, and it may be made simpler by the following considerations. In FIG. 1, it was necessary to introduce a function generator for the factor $$\frac{Kt_m}{1+Kt_m}$$

this involving the feedback by way of gear reduction 50 to the contact 49e. If computations be made of the effect on the output $l_o$ of the system as a whole with $Kt_m$ substituted for the foregoing fraction, it will be found that for a well bore 12,000 ft. in depth with a maximum tension of 5,000 lbs. on the cable at the surface, the difference in computed location of the tool will be less than 0.05 ft. Since the indicated error will be of the order of ½ inch, it can for all practical purposes be disregarded. Accordingly, the balanceable system 85 including a slidewire 49b and contact 49f will be effective through amplifier 49a to control the energization of the motor 49c to position the wheel 45 of the integrator 39 in the absence of the feedback arrangement of FIG. 1. More particularly, the wheel 45 will be positioned in accordance with the measured tension on the cable as detected by the strain-gage system 16. In other respects, the integrator 39 functions as in FIG. 1 and provides a solution for the term $$\left(-\int_0^{l_m} Kt_m dx_m\right)$$

This term is not fed into the system through an arithmetic means as in FIG. 1, but instead the output from the integrator through a gear reduction provided by gears 87 positions a contact 88a of a potentiometer 89 having its mid-point at ground potential and energized from a source 90 through a rheostat 91.

It will be recalled that in FIG. 1 the term of Equation 18 representative of $\Delta l_o$ was $$\frac{K}{2}T_m l'_o$$

Due to the fact that the stretch factor K for typical applications has values of the order of $5.5 \times 10^{-7}$, the product of $Kl'_o$ is small. For the same reason, the product of $Kl_m$ is likewise small. These considerations have led to the substitution of $l_m$ for $l'_o$ to produce an approximation for $\Delta l_o$ which then may be stated as $$\frac{K}{2}T_m l_m$$

As a specific example, if a well bore of 10,000 ft. be assumed, and if it be further assumed that the measured length $l_m$ may exceed the reference length $l'_o$ by as much as 20 ft., the difference in computation of $l_o$ by the computing system (because of the use of $l_m$ instead of $l'_o$) will be of the order of 0.275 ft. Here again the error is so small as to be of no practical consequence. Accordingly, the shaft 20 rotated in accordance with $l_m$ is arranged to operate through gears 93 to position a contact 94a of a potentiometer 94 which is energized by the output voltage from the strain-gage system 16. The output voltage developed between the movable contact 94a and the ground connection is representative of the product $$\frac{K}{2}T_m l_m$$

Thus, in FIG. 5, the aforesaid voltage output representative of $\Delta l_o$ is an electrical signal or function which is to be algebraically added to the voltage developed between contact 88a and the ground connection, this voltage representing a second electrical signal or function representative of $(-\Delta l_m)$. It will be noted that these voltages oppose each other in a circuit which includes a resistor 95 across which there appears a voltage which varies in accordance with the algebraic sum of the voltages representative of $(-\Delta l_m + \Delta l_o)$. A balanceable system 97 responds to the voltage across resistor 95 and through a motor 98 adjusts, through the mechanical connection 99, the cage of an arithmetic means 100 to modify the rotation of shaft 20 by a factor equal to $(\Delta l_o - \Delta l_m)$. Thus, FIG. 5 represents a solution of Equation 3 so that the rotation of the output shaft 101 equals $l_o = l_m - \Delta l_m + \Delta l_o$. Summarizing, $l_o$ (for all practical purposes)

$$= l_m - K\int_0^{l_m} t_m dx_m + \frac{K}{2}T_m l_m \quad (22)$$

The corrective systems included in FIG. 2 are equally applicable to the modification of FIG. 5. For example, the gears 61 and 70 of FIG. 2 will be driven by the shaft 20, and the resultant corrections introduced by the arithmetic means 67 and 75 will be accomplished by including such differential mechanisms 67 and 75 as at the points d and e of output shaft 101 of FIG. 5. Thus, the final output of shaft 101a will at all times correctly indicate the depth of the tool 10 in the well bore 11 whether that well bore be filled with air or liquid, or partly of both.

In initiating operation of the system of FIG. 5, the same considerations outlined in connection with FIG. 1 are applicable, namely, in respect to the positioning of the wheel 45 at the center of the disc 44 as the tool 10 is moved downwardly from the mouth of the borehole 11. The contact 88a will be opposite the ground connection to resistor 89, and the contact 94a will be at the ground connection of resistor 94.

For the system of FIG. 5, it has been emphasized that the quantity $(\Delta l_o - \Delta l_m)$ was algebraically added to $l_m$ in order to obtain the output quantity $l_o$.

FIGS. 6 and 7—The Preferred Embodiment

With the foregoing in mind, reference is now to be had to FIG. 6 where there has been illustrated an embodiment of the present invention of a type which has been found to be highly suitable for the determination of the true down-hole position of the logging tool 10 within the well bore 11. The embodiment of FIGS. 6 and 7 may in many cases be preferred over those earlier set forth.

Remembering that the term $$\frac{K}{2}T_m l_m$$

is representative of $\Delta l_o$, it will be readily understood that the differential of that term can be expressed in terms of its changing values as follows:

$$d\left[\frac{K}{2}t_m x_m\right] = \frac{K}{2}[x_m dt_m + t_m dx_m] \quad (23)$$

If Equation 23 be now integrated, the following equation is obtained:

$$\Delta l_o \approx \frac{K}{2}T_m l_m = \frac{K}{2}\int_0^{T_m} x_m dt_m + \frac{K}{2}\int_0^{l_m} x_m dx_m \quad (24)$$

The effect of the foregoing mathematical operation is to convert the term representative of $\Delta l_o$ into integral form, Equation 24 illustrating the fact that two integral expressions are required to specify $\Delta l_o$.

Now substituting the right-hand side of Equation 24 into Equation 22 for the last term thereof, there is obtained the following equation:

$$l_o = l_m - K\int_0^{l_m} t_m dx_m + \frac{K}{2}\int_0^{T_m} x_m dt_m + \frac{K}{2}\int_0^{l_m} t_m dx_m \quad (25)$$

An inspection of Equation 25 makes it self-evident that two terms may be combined, one which has previously been indicated to form a part of $\Delta l_o$, and the other which has previously been considered as being representative of $\Delta l_m$. Thus, Equation 25 may be rewritten as follows:

$$l_o = l_m - \frac{K}{2}\int_0^{l_m} t_m dx_m + \frac{K}{2}\int_0^{T_m} x_m dt_m \quad (26)$$

The system of FIG. 6 provides a solution of Equation 26 which it has been demonstrated will provide a mathematically correct determination of the true depth of the tool 10 in the well bore 11.

Referring now to FIG. 6, the measuring sheave 18 through the mechanical drive 119 introduces $l_m$ and the output from the strain-gage system 16 by means of the balanceable network 105 provides an output at the mechanical connection 106 corresponding with $t_m$. It will be noted that the mechanical drive 119 extends to a gear 108 of an arithmetic means 109 having an output shaft 110 arranged to drive the chart 21 of the recorder 22. There are algebraically added by the arithmetic means 109 the second and third terms of the right-hand side of Equation 26 to produce rotation of shaft 110 in a manner representative of $l_o$. This is accomplished in the following manner. The first integrator 112 through a gear 107, a gear 113 and mechanical connection 132, has its disc 114 driven in accordance with $x_m$. The wheel 115 is positioned by the motor 105a of balanceable system 105 by way of the reduction gearing 116 and the threaded shaft 117, so that the output shaft 118 of integrator 112 produces a quantity representative of the second right-hand term of Equation 26. The output shaft 118 drives the input of an arithmetic means 120.

A second integrator 122 has its disc 123 driven by the motor 105a through the mechanical connections 106 and 124 in accordance with $t_m$. The wheel 125 is positioned as a function of $l_m$, i.e., as $x_m$, the drive for the wheel being by way of the gears 107, 113, the mechanical connection 126, a gear reduction formed by the gears 127, the mechanical connection 128 and a threaded shaft 129. Thus, the output shaft 130 of the integrator 122 provides a solution of the last term of Equation 26. The output shaft 130 drives the other input shaft of the arithmetic means 120. The output shaft from the arithmetic means 120, as indicated by the mechanical connection 131, provides an output which is equal to the difference between the last right-hand term of Equation 26 and the next to the last term thereof. Thus, the output shaft 131 drives the input shaft of the arithmetic means 109 so as to algebraically add to it, the rotation introduced by way of the gear 108, a function representative of $l_m$ to produce the output $l_o$ at the shaft 110. This shaft 110 through connection 138a drives the chart 21.

It is to be again observed that some of the precautions set forth in the operation of the earlier modifications are equally applicable to FIG. 6 when utilized in the manner thus far described, for example, the wheels 115 and 125 of the respective integrators manually will be set at the respective zero positions when the tool 10 is at the surface. In this connection, it has already been indicated that such manual initial zeroing of the system can be avoided and that the zeroing will be automatically accomplished. It can be accomplished in FIG. 6 by operating the gearshift lever 135 to bring a gear 136 into mesh with a gear 137 driven from a mechanical connection 138 from output shaft 110. Thus, the gear 137 through gear 136 will drive, through mechanical connection 126, the gears 127, mechanical connection 128, the threaded shaft 129. Through mechanical connection 132, gear 113 will drive the disc 114 of integrator 112. Thus, the disc 114 of integrator 112 will be driven in accordance with $l_o$ and the wheel 125 of integrator 122 will be positioned on the disc 123 in accordance with $l_o$. The substitution of $l_o$ for $l_m$ may be justified by reason of the fact that the difference between these two quantities is really quite small as compared to the total values of the terms assumed during any given well-logging operation. Even if the difference between $l_o$ and $l_m$ be substantial, as much as 20 feet, say in 10,000, the effect of the substitution of $l_o$ for $l_m$ in the two integrals of Equation 26 introduces an error which is of exceedingly small magnitude. It is small because the result of the integration of the two terms of Equation 26 are respectively multiplied by one-half of K, the stretch coefficient. This coefficient has already been indicated to have a value of the order of $5.5 \times 10^{-7}$. Percentagewise for a well of 10,000 feet depth, the error will amount to about one-tenth of a percent of 20 feet, or approximately two hundredths of a foot.

Referring now to FIG. 7, it will be found that it is a substantial counterpart of FIG. 6 with a number of electrical elements and links substituted for mechanical elements and links of FIG. 6. For example, the output from the measuring sheave 18 is mechanically coupled by way of the connection 19 to a Selsyn transmitter 150. The Selsyn transmitter 150 is electrically connected through a switch 151 to a Selsyn receiver 152, a single cable having three conductors and only one contact of a three-pole switch being shown for simplicity. The Selsyn receiver 152 produces a mechanical output signal, as at shaft 153, to drive through a gear reducer 154 and the mechanical connection 132 the disc of integrator 112. The measured length, $l_m$, appearing at mechanical connection 132 may be utilized through a mechanical connection 154' to operate a counter 155. A driving connection 156 extends from connection 132 to a gear reducer 157 and from there by way of a connection 158 for positioning the wheel 125 of integrator 122.

The electrical output from the strain-gage system 16 is shown by the cable 159 to be applied to the null-balance potentiometer 105 (shown in more detail in FIG. 8) which through its amplifier 105b controls the energization of the motor 105a to drive, through mechanical connection 160a, the disc 123 of integrator 122. The motor 105a as in FIG. 6 drives through mechanical connections 160 and 161, a gear reducer 162 to position through connection 163 the wheel 115 of integrator 112. The output shafts 118 and 129 of integrators 112 and 122 are connected to the arithmetic means 120. The output of the arithmetic means is applied to a torque amplifier 164, of conventional design, which through mechanical connection 165 positions one element of another arithmetic means illustrated as a differential Selsyn 166. One winding of the differential Selsyn is energized from the output of the Selsyn transmitter 150 by way of the cable connection 167. The other winding of the differential Selsyn 166 is connected by the cable 168 to a Selsyn receiver 169, the rotor of which is mechanically connected to the chart drive for the recorder 22.

With the system functioning as thus far described, it will be necessary to, prior to each logging run, re-zero the two integrators 112 and 122 with the tool 10 at the mouth of the well bore 11. In order to avoid this operation, which can ordinarily be readily accomplished, the switch 151 may be moved to complete a circuit through the lowermost contact 151a to complete an electrical circuit through the three-conductor cable 170 from the output of the differential Selsyn 166. Thus, the output, corresponding with a function representative of $l_o$, is applied to the Selsyn receiver 152 to operate through the gear reducer 154 the disc 114 and to adjust the wheel 125 of the respective integrators in accordance with change, $x_o$ in $l_o$.

In FIG. 7, it may be further noted that a counter 172 is actuated from the motor 105a to provide an indication of the measured tension or the output from the strain-gage system 16. The stop 173, connected to the motor shaft, may be provided to avoid driving the slidewire of the null-balance potentiometer 105 beyond one of its limits and to avoid damaging the gear reducer 105c in case the wheel 112S should be driven to one of its limits.

The system of FIG. 7 lends itself for the introduction of the corrective systems illustrated and described in connection with FIG. 2. The mechanical output to the corrective systems will be derived from the shaft 153 as at point c through suitable gearing as shown at 61 and 70 of FIG. 2, while the arithmetic means 67 and 75 of FIG. 2 will be introduced into the system of FIG. 7 at the points of mechanical connection 165 as indicated by the reference characters d and e and appearing just after the torque amplifier 164.

In one operative embodiment of the system of FIG. 7, the gear reducer 154 had a gear ratio of 270 to 1, the gear reducers 157 and 162 had ratios of 60 to 1 and the gear reducer 105c a ratio of 7 to 1.

The rebalancing slidewire 105s (FIG. 6) for the strain-gage system was of the ten-turn helical type. By means of the gear ratio provided by the gear reducer 105c, the balancing motor 105a will be rotated seven times for each rotation of the slidewire. In this connection, while the contact of the slidewire 105s has been shown in FIG. 6 as adjustable, it is customary in practice to rotate the slidewire itself, leaving the contact relatively stationary. It is to be understood that either design will be entirely satisfactory. With a possible 70 turns for the motor to correspond with the ten-turn slidewire, the stops indicated at 173, FIG. 7, may be set to limit the number of turns of the motor to a lesser number, say 65.

While the above examples are exemplary for one embodiment of the system, it is, of course, to be understood that the selection of the ratios for each of the gear reducers employed will represent but one factor in the design of a system to meet the conditions to be served by other applications. As an aid in selecting such factors, it will generally be desirable to have a gear ratio associated with each of the integrators, such that the output shaft, say shaft 118 of integrator 112, shall have one rotation for each rotation of the input shaft 132 which drives the disc when the wheel 115 is positioned adjacent the rim of the disc 114. Each rotation of a shaft or of the mechanical connections 153, 118 and 129 preferably represents one foot of depth change. With these desirable operating characteristics, the next consideration will be the approximate maximum values of cable tension and cable length required in a particular system. Let it be assumed, for example, that the maximum depth ($l_m$) will be 16,000 feet and the maximum cable tension ($t_m$) at the surface will be 13,000 pounds.

Substituting or utilizing these values in the first integral term of Equation 26, and utilizing the earlier-mentioned value of $5.5 \times 10^{-7}$ for the stretch coefficient K, it will be found that the integral will have a value corresponding to 57.2 feet. This means that the output shaft 118 of integrator 112 will have to rotate through 57.2 revolutions to meet the maximum conditions to be encountered. In order for the shaft 118 to make the required 57.2 revolutions, the input shaft 132 must also make 57.2 revolutions during the time the tool 10 is moved from the mouth of the well bore to its maximum depth of 16,000 feet.

Keeping in mind that the wheel of each integrator is moved from the center of the disc to the rim with one revolution of the adjusting shafts or connections (158 and 163 respectively), it will be seen that the shaft 158 must make one revolution when the shaft 132 is rotated through 57.2 revolutions. It will thus be seen why the gear reducer 157 has been selected to have a 60 to 1 ratio, this being a conveniently available gear reducer.

From the foregoing, it will be seen that the gear reduction for gear reducer 154 is readily obtained by dividing the maximum depth by the selected number (60) of revolutions desired for the shaft 156. The result of the division suggests a gear ratio of 266⅔ to 1. Again, commercially available gear reducers are obtainable with gear ratios of 270 to 1. Thus, the gear reducer 154 may have a ratio of 270 to 1. In this connection, the result of the selection of the higher gear ratio means the system may accommodate a somewhat greater depth, as 16,200 feet, instead of the initially assumed lower value of 16,000 feet. The gear reducers 157 and 162 will have the same 60 to 1 gear ratios so that the output shafts or connections 118 and 129 will have corresponding values of one foot per revolution. If the stretch coefficient should change, due to aging of the cable, then identical corrections will be made in both integrators. Such adjustments are made by zeroing the positioning wheel of integrator 112 and changing by a factor the turns of motor 105a per unit of cable tension. Because the motor 105a is connected to both the disc 123 of integrator 122 and to the positioning wheel 115 of integrator 112, the inputs to both integrators will be changed by the same factor.

The manner in which a correction for variations in stretch coefficient, due to aging or due to other change thereof in the logging cable, may be introduced in the system will be described in detail in connection with the strain-gage system of FIG. 8.

Further in connection with gear reducer 162, FIG. 7, if it is selected to have the 60 to 1 ratio, then the number of turns of the slidewire 105s multiplied by the ratio of the gear reducer 105c must be greater than 60. Since the slidewire 105s has 10 turns, the gear reducer 105c preferably has a ratio of 7 to 1. This provides for a maximum of 70 turns for the motor 105a and of the shaft 148 in order to move the slidewire from one to the other of its limits.

It will be understood that the above examples given of gear ratios are by way of illustration and are not intended to limit the scope of the present invention. Likewise, it will be understood that other equivalent arrangements and placements of gear reducers may be employed in carrying out the invention; for example, where the ratios of the gear reducers 162 and 157 are made to differ from one another, equivalent steps may be taken to restore the symmetry they provide when they are equal. Thus, if the gear reducer 162 is assigned a ratio of 30 to 1 instead of 60 to 1, a speed-up gear (not illustrated) having a ratio of 1 to 2 should be added in the shaft or drive 160a to increase the rotation of the disc 123.

Referring now to FIG. 8, there is illustrated in detail a strain-gage system which may be employed for the strain-gage system 16 illustrated in FIGS. 1, 2, 5, 6, and 7. It is particularly adapted for use in FIGS. 1, 6 and 7. The system 16 includes strain-gages in a bridge circuit 16a of a type well known to those skilled in the art. The bridge 16a includes impedance elements which are responsive to tension, the resistors 250 and 251, and elements which are responsive to compression, the resistors 252 and 253. The elements 250–253 are suitably secured to a ring-shaped element (not shown) used for member 15 of FIG. 1. The bridge is energized from a suitable source represented by battery 254. When the bridge 16a is subjected to strain, either compression or tension, the resistance values of the affected resistors change to unbalance the bridge and produce a signal voltage. This signal voltage appears across conductors 255 and 256 and is applied to the input of a measuring system 260 which may be of the type disclosed in the aforesaid Williams' patent and like balanceable system 36 of FIG. 1. A balance motor 260a produces a rotation of the shafts 261 and 262 which is representative of the magnitude of the signal produced by the bridge 16a. The shaft 262 is connected by way of a gear reducer 263 to adjust a contact 264a relative to a slidewire 264 to rebalance the bridge circuit 16a and to reduce the error signal to zero.

The bridge circuit 16a includes a means for initially balancing the bridge so that under selected conditions the output from the bridge is zero. This means is provided by way of the network including a variable impedance represented by a slidewire resistor 257 whose movable contact 257a is connected to one terminal of the bridge 16a.

An output network of the bridge includes a resistor 270 of low impedance which is connected by way of resistor 271 and conductors 272 across the terminals of the potentiometer 264. Rheostat 273 is provided for calibration purposes. The value of the rheostat 273 is adjusted by moving contact 273a so that a given signal from the bridge will be representative of a known value of strain and of course, representative of the measured tension $T_m$.

The mechanical output signal of the balancing motor 260a is transmitted by way of shaft 261 and gear reducer 275 electrically to unbalance a second bridge 280. There is generated an electrical signal representative of the strain on the cable. This arrangement is in the nature of a repeating system and is provided in order to isolate electrically the strain-gage bridge from the other components of the measuring system. It is important that failure or erratic operation of the other components of the measuring system have no effect upon the strain-gage bridge. In practice, the output from the strain-gage is repeated in a meter 33 (FIG. 1) placed before the operator who is raising and lowering the logging tool. This meter indicates to the operator the ease with which the logging tool is moving within the well bore. The operator will know that if the index of meter 33 suddenly moves in an upward direction the tools has stuck in the well bore and he should immediately stop the cable to avoid snapping it. Should some components of the measuring system become faulty, it may affect the operation of the strain-gage bridge and the operator not having a true indication of cable strain before him may unintentionally cause the cable to be snarled or snapped downhole.

The second bridge 280 includes a potentiometer slidewire 281 and the potentiometer slidewire 105s, which is the same slidewire or potentiometer illustrated in FIG. 6. The slidewire 281 is connected to slidewire 105s by way of conductors comprising cable 159. The bridge is energized from a suitable source illustrated by the battery 282. One side of the battery is connected to the bridge by way of resistor 283 and potentiometer 284.

When a signal is produced at the strain-gage, the shaft 261 is rotated to adjust the value of the potentiometer 281. A signal is produced by the bridge 280 and applied to the input of the amplifier 105b. As explained in connection with FIG. 6, this signal is applied to the amplifier 105b which is effective to energize motor 105a to readjust the potentiometer 105s to a condition of balance.

The system of FIG. 8 is also adapted for calibration of the system of FIGS. 6 and 7, and in so doing, to provide for the selection of an appropriate value of stretch coefficient for the cable being employed. More particularly, this calibration is provided by the potentiometer 284, the adjustment of which varies the output of the potentiometer 105s. Variations in the output of the potentiometer 105s produce a change in the rotation of the disc 123 (FIGS. 6 and 7) and the placement of the wheel 115. This change has a like effect in the output of both integrators and is equivalent to multiplying the outputs of the integrators by a new constant. While the adjustment of the potentiometer 284 (FIG. 8) will have some effect in changing the maximum allowable cable tension that the system of FIGS. 6 and 7 will be able to accommodate, the change is normally quite small and for all practical purposes need not be considered.

Now that several embodiments of the invention have been described, it will be understood that other systems will suggest themselves to those skilled in the art. For example, there is illustrated in FIG. 9 yet another embodiment for the practice of the present invention. It is an electronic system applying the principles of digital computation. The system of FIG. 9 provides a solution of Equation 26.

As the cable is raised and lowered in the well bore, a first signal generator 300 produces a pulse, a first digital signal, for each predetermined increment of cable passing over a sheave 326. The sheave 326 is mechanically coupled to a pulse generator including a serrated wheel 301 having a plurality of teeth 302 for engaging a movable switch contact 303. The movable contact is normally restrained in a mid-position between fixed contacts 305 and 306 by means of springs 307 and 308. When the cable is being moved downhole, the wheel 301 moves in a counterclockwise direction causing the movable contact 303 periodically to engage fixed contact 305 and transmit from battery 305a a positive pulse along conductor 309 to a gating pulse generator 310. When the cable is being moved uphole, negative pulses are generated. The wheel 301 rotates in a clockwise direction with uphole movement of the cable to cause contact 303 to engage fixed contact 306. The circuit to battery 306a is closed and a negative pulse is transmitted along conductor 309 to gating pulse generator 310.

Each time a pulse of either polarity is produced, the gating pulse generator 310 will produce a pulse whose duration is determined by the magnitude of an analogue signal representative of strain on the cable and applied thereto by way of conductor 311. The gating pulse generator 310 may be of any well known type, including a phantastron. The phantastron is an accurate timing circuit, and may be triggered by either negative or positive pulses.

Each time the gating pulse generator 310 is triggered, the pulse is applied to open a gate 312 for transmitting a train of pulses from a pulse generator 313 to a reversible binary counter 314. The pulse generator 313 may be an oscillator of any well known type, stable in operation and of constant frequency. The frequency of the generator 313 may be about 10 kc. The number of pulses transmitted from the pulse generator 313 through the gate 312 to the binary counter 314 will vary with the duration of the gating pulse from the pulse generator 310. The binary counter 314 adds up the pulses from the pulse generator 313 to perform the first of the integrations of Equation 26. The function of the reversible binary counter may be likened to that of the integrator 112 of FIGS. 6 and 7.

In order that the binary counter 314 be able to take into account both the increase and decrease in cable length, it is required that the binary counter or its equivalent be reversible in operation—i.e. be capable of both addition and subtraction. The operations of addition and subtraction are controlled by a control binary 315 which is responsive to the polarity of signals transmitted by way of conductor 309 and conductor 309a from batteries 305a, 306a to select the operation to be carried out by the binary counter 314. A circuit which may be employed as a control binary and a reversible binary counter is illustrated in Pulse and Digital Circuits (1956) by Millman and Taub at page 655.

The integration of the second integral of Equation 26 is performed by identical apparatus comprising the pulse generator 320, the gate 321, the gating pulse generator 322, the control binary 323, and the reversible binary counter 324. The signal from the strain-gage 16 being electrical in nature, it is necessary to convert it to a mechanical signal so as to employ the same type of signal generator 300' as signal generator 300 for production of input signals for the integrating system. The system for converting the electrical signal from the strain-gage 16 to a mechanical signal may be a measuring system 325 of the type described in the aforesaid Williams patent. The mechanical output signal of the measuring system is applied by the shaft 330, to the signal generator 300' for the generation of a digital signal representative of tension.

The signal controlling the duration of each pulse from the gating pulse generator 322 is an analogue signal representative of the length of cable $l_m$ measured by sheave 326. It is generated by the signal generator 300 and is applied to the gating pulse generator 322 by way of conductor 331. To produce the analogue electrical signal, the signal generator 300 includes a potentiometer 332, mechanically coupled by way of shaft 333 to the sheave 326.

In the generation of the signal representative of total tension for control of the duration of pulses from gating pulse generator 322, a potentiometer, similar to potentiometer 332, would be included in generator 300' and would be mechanically coupled to the shaft 330 to produce the analogue signal representative of tension.

The outputs from the reversible binary counters 314 and 324 are combined by another reversible binary counter 340. It is possible that the reversible binary counters 314 and 324 may produce output pulses at the same time. In such cases, the binary counter 340 would be unable to respond thereto. Therefore, there are provided buffers 341 and 342 connected between the outputs of the binary counters 314 and 324 and the inputs of the binary counter 340. These buffer circuits are in the nature of storage units which hold information from the binary counters 314 and 324. When the reversible binary counter is in condition to receive input signals from one or the other of the buffers 341 and 342, a synchronizing signal will be applied to the buffers, and they will individually and sequentially unload their binary information into the reversible binary counter 340. Buffer binaries which may be employed in the system of FIG. 9 are available from Telemeter Magnetics, Inc., of Los Angeles, California. They are identified as Magnetic Core Storage Units, Type 1092 series.

The output from the binary counter 340 energizes a reversible stepping relay 343 which converts the electrical binary signal to a mechanical stepping motion and transmits the mechanical signal to a differential Selsyn 345. The stepping relay is responsive to a signal from the reversible counter 340 by way of conductor 344 to reverse its stepping direction so that it is synchronized with the binary counter 340 in adding and subtracting.

The differential Selsyn 345 which receives at one input the mechanical output of the stepping relay 343, receives at a second input by way of conductors, represented by cable 346, an analogue signal representative of the length of cable measured at the sheave 326. This electrical signal is produced by a Selsyn transmitter 347 mechanically coupled by way of shaft 348 to the sheave 326.

The output from the differential Selsyn 345, like that of the differential Selsyn 166 of FIG. 7, is an electrical signal representative of the true length $l_o$ of cable and the downhole position of the logging tool. The output from the differential Selsyn 345 is applied by way of a plurality of conductors represented by cable 214 to effect the movement of a recording chart in the manner described in connection with FIGS. 6 and 7. Accordingly, there is at all times represented by the position of the logging chart a true, accurate indication of the position of the logging tool so that thereafter an accurate interpretation may be made of the characteristics of earth strata traversed by the borehole and which will facilitate later operations to be carried out in connection with the production of the well.

The system of FIG. 9 like the preceding embodiments of the invention is also capable of indicating downhole movement of the logging tool due solely to variations in tension. Assuming that the cable has been stopped at the surface, the sheave 326 will no longer move; and, therefore, the gating pulse generator 310 will be inactive in the absence of further pulses from the pulse generator including the serrated wheel 301. However, an electrical signal will continue to be transmitted from the potentiometer 332, indicating the last-measured value of $l_m$ from the sheave 326. This electrical signal is applied over conductor 331 to the gating pulse generator 322. Now, should a change in tension take place, that change in tension will result in a signal being produced by the signal generator 300'. A pulse will be transmitted to operate the gating pulse generator 322 and the gate 321 will be opened for a period determined by the magnitude of the signal derived from the potentiometer 332. A series of pulses from the pulse generator 320 will be transmitted through the gate 321 to trigger the binary counter 324 and finally produce a change in the signal output from the differential Selsyn 345 which is effective to adjust the recorder drive.

Yet another modification of the present invention is illustrated in FIG. 10. This modification is provided for the purpose of comparing the magnitude of a function calculated by the system of FIG. 1 against a periodically measured magnitude of the same function. More particularly, the modification of FIG. 10 provides a check upon the calculated value of the reference length $l'_o$. In carrying out this check or comparison, the reference length $l'_o$ is periodically measured in a manner hereinafter described; and the measured value of $l'_o$ is compared with the instantaneous calculated value of the same function appearing at the output of the arithmetic means 37, FIG. 1, as represented by the rotation of the shaft 35.

The periodic measurement of the reference length, or function $l'_o$, is made possible by initially stressing the cable at the reference tension and providing magnetic or other type of markers at predetermined, equally spaced points along the length of the cable. The marking of a cable and the detection of these marks is well known in the art. The function of the system of FIG. 10 is such that every time a marker is detected, the value of $l'_o$ it represents is immediately compared with the instantaneous value of the calculated magnitude of $l'_o$. Any difference or deviation that exists between the measured and calculated values of the function is immediately applied to modify the calculated value of the function.

In carrying out this correction, the cable 12 is provided, as aforesaid, with spaced magnetic markers. As the cable is moved over the idler pulley 13, the pulses are detected by a suitable magnetic detector 400, and the detected signal or pulse is modified in character by a pulse shaper 401 to provide a trigger pulse of short duration. The pulse shaper 401 may be of any type or combination well known in the art. For example, the pulse shaper may include an amplifier for increasing the magnitude of the detected signal and a multivibrator whose output may then be applied to a blocking oscillator. Upon triggering of the blocking oscillator, there will be produced a trigger pulse of the character above-described. This trigger pulse is applied by way of conductor 402 to actuate a gate 403 for initiating the comparison between the calculated and the measured values of $l'_o$.

The calculated magnitude of $l'_o$ as appearing at the output of the arithmetic means 37 is applied by way of shaft 35a to adjust the contact 404 of a potentiometer relative to slidewire 405. The slidewire 405 has its center tap grounded and is energized from a suitable source of power represented by the polarity signs. Assuming that the magnetic markers have been originally placed on the cable at 100-foot intervals and each rotation of the contact 404 is equivalent to 20 feet of the calculated value of $l'_o$, the contact 404 will make 5 rotations for every 100-foot interval of the calculated reference length $l'_o$. If the calculated value of the reference length is exactly equal to the measured value of the reference length, then the contact 404 will be at the grounded point of the slidewire 405 every time a magnetic marker is detected by the detector 400. On the other hand, should there be a difference between the calculated value of the reference length and the measured value of the reference length, the contact 404 will be at some position other than the grounded center tap of the slidewire 405 when the magnetic marker is detected, and a signal will be applied through the gate 403 and the condenser 406 will immediately be charged to a value corresponding to the error between the measured and calculated values of $l'_o$. The gate 403 and the condenser 406 operate in a manner illustrated and described in the United States Patent No. 2,704,364 of Gerald C. Summers and identified in that patent as switch 32 and condenser 50.

The change in the charge on the condenser 406 varies the output from the cathode-follower stage 407. Null-balance system 408 responds to the voltage applied from the cathode-follower stage 407 to balance on this signal voltage and produce on output shaft 409 a mechanical rotation representative of the correction to be made in the calculated value of $l'_o$. This rotation is applied to an input of an arithmetic means 410 which combines the correction signal and the calculated value of $l'_o$, as appearing on the shaft 35. The new or correct value of $l'_o$ appears at the output of the arithmetic means 410 at shaft 35d and this value is then employed as in the embodiment of FIG. 1 for further computation which will result in the production of a signal representative of the true length $l_o$ of the cable 12.

If at the time the next magnetic marker is detected the contact 404 is in the same position it was in before, the charge on the condenser 406 will not change and no further correction will be added. However, should the contact 404 be in a new position at the time the magnetic marker is detected, the condenser will immediately assume a charge corresponding with the voltage between the slidewire contact 404 and ground. This new voltage will be sensed by the null-balance system to effect a further correction in the calculated value of the reference length $l'_o$ as appearing at the output of the arithmetic means 410.

It will be recalled that in the initial disclosure of FIG. 10, the assumption was made that the markers were placed on the cable while the cable was stressed at a reference tension. This reference tension may differ from the preferred value which is the weight of the logging tool in air. In such a case, it will be convenient to select the reference tension equal to the tension at which the cable is stressed when the markers are added. This change in the reference tension from the previously selected value equal to the weight of the tool in air will require a correction in the final computed value of $l_o$. Such correction may conveniently be added in a manner similar to that employed in FIG. 2 for the introduction of the correction term $$\frac{K}{2} W_d l'_o$$

It can be shown that the correction referred to above can be very closely approximated by the term $$\frac{K}{2}(T' - W) l'_o$$

Since only the last expression of this term is a variable, the correction may be introduced by selecting a proper ratio for the gears 63 of FIG. 2 equal to this constant. From the above, it will be obvious to those skilled in the art as to how to construct a system which is a substantial duplicate of that portion employed in FIG. 2 for $$\frac{K}{2} W_d l'_o$$

to now introduce the correction necessary whenever the reference tension T' is selected to have a value other than W.

Employing the teaching of FIG. 10, it is now possible to provide an alternate arrangement for producing the function $l'_o$. This arrangement is illustrated in the modification of FIG. 11. In this arrangement, the measured value $l_m$ of the cable is periodically corrected in response to detection of magnetic markers on the cable to provide a function which varies as the magnitude of the reference length $l'_o$. More particularly, the magnitude of the measured length of the cable as sensed by the idler pulley 13, which performs the function of measuring sheave 18 (FIG. 1), is applied as a mechanical signal by way of shaft 35b to the input of the comparison means 420. The comparison means 420 is illustrated in block form and comprises the elements enclosed within the block defined by the dashed lines of FIG. 10. The shaft 35b adjusts the position of a movable contact, such as the movable contact 404 of FIG. 10. Each time the magnetic markers on cable 12 are sensed by the detector 400, there is applied by way of pulse shaper 401 a control pulse which energizes the comparison means to produce a signal representative of the difference between the measured length $l_m$ of the cable and the measured value of the reference length $l'_o$. This output signal is applied by way of shaft 409 to a first input of the arithmetic means 410. At the same time, the measured length $l_m$ of the cable is applied by way of shaft 35c to a second input of the arithmetic means 410. The signals are combined to produce at the output of shaft 35d a mechanical signal representative of the reference length $l'_o$ of the cable.

Having now computed $l'_o$ in terms of the output of shaft 35d Equation 1 becomes applicable if there be added to the output of shaft 35d a rotation representative of $\Delta l_o$. The latter function is produced in FIG. 11 by utilizing the output from the strain-gage system 16 which through a conductor cable 32a—b applies to the multiplier slidewire 34 a voltage. The multiplier in conjunction with the null-balance system 36 produces a mechanical output at shaft 36d representative of $\Delta l_o$ and in the same manner that rotation of that shaft in FIG. 1 is representative of $\Delta l_o$. The latter rotation of shaft 36d is combined with that of shaft 35d through the arithmetic means 41 to produce in output shaft 29 rotation representative of the depth of the tool 10 in the borehole 11, more particularly representative of $l_o$.

Inasmuch as the magnetic markers on cable 12 are applied thereto when the cable is under a selected reference tension, it will in some cases be desirable to zero the output of the strain-gage system 16 with the tool at the mouth of the well bore and with a weight added to the tool to make it equal to the selected reference tension existing at the time the magnetic markers were applied thereto. In this connection, other marking means can be applied to the cable and detected in any suitable way, as for example, by adding mechanical elements.

In FIG. 11, the function $l'_o$ was generated by applying a correction to the function $l_m$. Since the spacing between markers on the cable 12 was definite and fixed at the time the cable was under a reference tension, the length that the cable would have when under a reference tension can at all times be computed by merely counting the number of markers on a given length of cable and regardless of the actual length of the cable at the time the counting is undertaken. In consequence, a marker-counting system can be utilized directly to generate the function $l'_o$. Such a counting system could conveniently take the form of a stepping relay, the shaft rotation of which would then be applied to the arithmetic means 41. To the rotation of the shaft would be added $\Delta l_o$ in production of the final output function representative of $l_o$.

There will now be undertaken a more detailed description of the portion of the system of FIG. 1 which in response to a signal from the strain-gage system 16 produces the function $$\frac{Kt_m}{1+Kt_m}$$

for positioning the wheel 45 of the wheel and disc integrator 39.

The electrical signal from the strain-gage 16 is developed across the potentiometer 49$d$. A fraction of this signal developed across the portion $R_1$ of the potentiometer 49$d$ is applied to the input of the null-balance system 49. The mechanical output of the null-balance system representative of the magnitude of the electric input signal is applied by way of the variable speed changer 47$a$ and shaft 48 to position the wheel 45.

The output from the null-balance system 49 is also applied to a speed or gear reducer 50 whose output is coupled to the movable contact 49$e$ of the potentiometer 49$d$. The signal fed back to the potentiometer by way of the speed reducer 50 operates upon the movable contact 49$e$ in such a manner that if the input signal developed across resistance $R_1$ were to be considered as Y, the output from the null-balance system 49 will be in the relationship of $$\frac{Y}{1+Y}$$

A more complete understanding of the operation may be had from the equations which are now to be developed. It is to be understood in connection with this system that $R_1$ and $R_2$ change with the tension signal developed. Hence, the final rotational output from the null-balance system 49 is dependent upon the tension and the feedback through the speed reducer 50. In order to gain a better understanding of the operation of the system and the manner in which it generates the desired function, the operation will be considered as a series of steps. More specifically, the feedback system, including speed reducer 50, will be assumed initially disconnected to avoid any complications which might arise from consideration of continuous operation of the feedback system. Each step will consist of performing the equivalent feedback to the movable contact 49$e$ which would have resulted from the rotation produced by the null-balance system and transmitted by speed reducer 50 during the preceding step.

The voltage $V_0$ across the potentiometer 49$e$ will be constant throughout these steps and may be expressed as $$V_0 = C_s t_m \quad (27)$$

where $C_s$ is a constant of the strain-gage system, and
$t_m$ is the strain measured by the strain-gage. It is assumed constant throughout the steps.

The rotational output $\theta$ of the null-balance system in terms of motor rotation will be given by $$\theta = C_c V_1 \quad (28)$$

where $C_c$ is a constant of the null-balance system, and
$V_1$ is the signal voltage developed across the resistance $R_1$.

Since Equation 28 does not involve application of feedback, it will be referred to as the rotation after the first step.

The null-balance system 49 has a high impedance input circuit so that the current drain upon the potentiometer 49$d$ is negligible. Therefore, by Ohm's Law, the following relationship may be written for the potentiometer and will hold true throughout the operations:

$$\frac{V_1}{R_1} = \frac{V_0}{R_1+R_2} \quad (29)$$

where $V_0$ is the total voltage across the potentiometer 49$d$,
$R_1$ is the resistance of the potentiometer across the input circuit of the null-balance system 49, and
$R_2$ is the remaining resistance of the potentiometer 49$d$.

For the first rotation or step, the voltage $V_1$ may be expressed in terms of the strain measured by the strain-gage system 16. More particularly, this expression for the voltage $V_1$ is obtained by substituting Equation 27 for the expression $V_0$ in Equation 29. For the convenience of including in the final terms to be derived the stretch coefficient K, both sides of the newly derived equation are multiplied by $$\frac{K}{K}$$

to produce the desired expression for the voltage $V_1$ under initial conditions. This equation is:

$$V_1^0 = \frac{R_1^0}{R_1+R_2} \frac{C_s K t_m}{K} \quad (30)$$

where $R_1^0$ is the initial value of $R_1$ for these steps.

The voltage $V_1^0$ of Equation 30 will cause the null-balance system 49 to produce a mechanical output signal which is expressed mathematically as $$\theta_0 = \frac{R_1^0}{R_1+R_2} \frac{C_c C_s K t_m}{K} \quad (31)$$

and is derived by substituting the voltage $V_1^0$ from Equation 30 into the general Equation 28 where $V_1^0$ appears in the general form $V_1$. Equation 31 is the initial rotational value of the output of the null-balance system and here represents the results of the initial step.

For the first step $\theta_0$ is applied to the speed reducer 50 from which is derived a fraction of the rotational output or $\rho\theta_0$ which is effective to reduce the value of the resistance $R_1$ by adjusting the position of the contact 49$e$. $\rho$ is the gear ratio of the gear reducer 50 and is selected to be less than unity. $\rho\theta_0$ may be written as $$\rho\theta_0 = \left[\frac{\rho R_1^0}{R_1+R_2}\right]\left[\frac{C_c C_s K t_m}{K}\right] \quad (32)$$

Equation 32 expresses $\rho\theta_0$ in terms of rotation. The change in the value of the resistance $R_1$ may now be written. If the resistance $R_1^0$ is considered to have $n$ turns, the reduction in $R_1$ as a result of the first step which will be expressed as $\Delta R_1(1)$ will be given in terms of resistance change per rotation as $$\Delta R_1(1) = \frac{-R_1^0}{n} \frac{\rho R_1^0}{R_1+R_2} \frac{C_c C_s K t_m}{K} \quad (33)$$

The change in the voltage $V_1$, expressed as $\Delta V_1(1)$, may now be written. With the change in the resistance $\Delta R_1(1)$ known from Equation 33, it is only necessary to multiply the change in resistance by the current flowing through the resistance $R_1$ which is the same current flowing through the entire potentiometer 49$d$. More particularly, the current flow through the potentiometer 49$d$ may be found by dividing the voltage $V_1^0$ by the resistance $R_1^0$ or dividing Equation 30 by $R_1^0$ to get $$\frac{1}{R_1+R_2} \frac{C_s K t_m}{K} \quad (34)$$

The voltage change $\Delta V_1(1)$ is now obtained by multiplying Equations 33 and 34 to get $$\Delta V_1(1) = -\left[\frac{R_1^0}{R_1+R_2} \frac{C_c C_s K t_m}{K}\right] \frac{\rho R_1^0}{n} \frac{1}{R_1+R_2} \frac{C_s K t_m}{K} \quad (35)$$

This change in the input voltage to the null-balance system effects a change in the rotation of the motor 49$c$. The rotation change $\Delta\theta(1)$, which is the result of the first step, can now be obtained by applying the relationship of Equation 28 to Equation 35. Then, both sides of Equation 35 are multiplied by $C_c$ and the terms grouped to get $$\Delta\theta(1) = -\frac{\rho}{n}\left[\left(\frac{R_1^0}{R_1+R_2}\right)\left(\frac{C_cC_sKt_m}{K}\right)\right]^2 \quad (36)$$

It is now readily seen that Equation 36 can be simplified since the expression within the brackets is $\theta_0$. (See Equation 31.) Therefore, Equation 36 is the same as $$\Delta\theta(1) = -\frac{\rho}{n}(\theta_0)^2 \quad (37)$$

For the second step $\Delta\theta(1)$ is fed back to the input of the speed reducer 50. Since the parameters of this feedback system are fixed, any rotation fed back to the speed reducer 50 results in a new rotation at the output of the null-balance system which is a constant times the value of the rotation. It is apparent from Equation 37 that this constant is $$-\left(\frac{\rho}{n}\right)\theta_0$$

The rotation resulting from the second step may be written as $$\Delta\theta(2) = -\frac{\rho}{n}\theta_0\Delta\theta(1) = \left(\frac{\rho}{n}\right)^2\theta_0^3 \quad (38)$$

and the rotation resulting from the third step is given by $$\Delta\theta(3) = -\frac{\rho}{n}\theta_0\Delta\theta(2) = -\left(\frac{\rho}{n}\right)^3\theta_0^4 \quad (39)$$

Subsequent steps are performed in the same fashion as indicated by Equations 38 and 39. As the number of steps becomes large, the total rotation $\theta$ at the output of the null-balance system is given by $$\theta = \theta_0 + \Delta\theta(1) + \Delta\theta(2) + \ldots = \frac{n}{\rho}[Y - Y^2 + Y^3 - \ldots] \quad (40)$$

where $$Y = \frac{\rho}{n}\frac{R_1^0}{R_1+R_2}\frac{C_cC_sKt_m}{K} \quad (41)$$

Since $Y - Y^2 + Y^3 - \ldots$ is the series expansion of the term $$\frac{Y}{1+Y}$$

the expression for the total rotation of Equation 40 is $$\theta = \frac{n}{\rho}\frac{Y}{1+Y} \quad (42)$$

With $$\frac{\rho}{n}\frac{R_1^0}{R_1+R_2}\frac{C_cC_s}{K}$$

chosen to be unity, then Equation 42 may be written as $$\theta = \frac{n}{\rho}\left[\frac{Kt_m}{1+Kt_m}\right] \quad (43)$$

Since $n$ represents the number of turns for the initial value of $R_1$ and which will, of course, be a selected fraction of the turns for the total resistance 49d, a value representative of $n$ may be readily selected for the system of FIG. 1. Similarly, the gear ratio $\rho$ is readily determined by the rear reducer 50. Thus, there has been demonstrated the mathematical proof for the operation of that part of the system of FIG. 1 which produces an output corresponding with that part of the right-hand side of Equation 43 appearing within the bracket.

For simplification in the presentation and discussion of the invention, the simplest kind of symbols have been utilized. Thus, each integrator has been represented as of the disc and wheel type. It is to be understood that any of the well known forms of integrators will be applicable, and in general, integrators of the ball type will be preferred when the integration is to be accomplished mechanically.

Reference may be had to the text entitled "Computing Mechanisms and Linkages" by Svoboda, published by McGraw-Hill, 1948. It is to be further understood that the strain-gage system 16 likewise is to be taken as typical of those available and that reference to such texts as "Strain Gauge Techniques," published by Murray et al., 1956, may be referred to for other types of strain-responsive systems.

Now that the principles of the invention have been explained and several embodiments thereof fully described, it will be understood that further modifications may be made and certain parts may be used in place of other parts, all within the scope of the appended claims.

What is claimed is:

1. The method of determining the position in a well bore of a tool supported by a cable subject to change in length with change in tension thereon, comprising the steps of generating a first function having a magnitude dependent upon, and which increases with, the length of cable payed out as the tool is lowered in the well bore and which decreases as cable is taken in at the surface to raise the tool in the well bore, generating a measuring function representative of the tension on the cable at the surface, generating a second function derived from said first function and from said measuring function and representative of the difference between the true position of the tool and the magnitude of said first function, adding said first and second functions to produce a third function, and positioning an indicating element in accordance with the magnitude of said third function to indicate the true position of the tool within said well bore.

2. The method of determining the position is a well bore of a tool supported by a cable subject to change in length with change in tension thereon, comprising the steps of generating a first function representative of the length the cable within the well bore would have when under a selected reference tension, generating a measuring function representative of a measured value of tension on the cable at the surface of the earth, generating a second function derived from said first function and from said measuring function representative of the tension on the cable at the surface and representative of the difference between the position of the tool and the magnitude of said first function, and adding said first and second functions to produce a third function representative of the position of said tool within said well bore.

3. The method of determining the position in a well bore of a tool supported by a cable subject to change in length with change in tension thereon, comprising the steps of generating a first function representative of the length of cable payed out and taken in at the surface as the tool is lowered and raised in the well bore, measuring a value of the tension on the cable at the surface, generating a second function derived from said first function and from the measured value of the tension on the cable at the surface and representative of the change in cable length due to change in said tension, and adding said second function to said first function to produce a third function representative of the tool position.

4. The method of determining the position in a well bore of a tool supported by cable subject to change in length with change in tension thereon, comprising the steps of generating a first function representative of the length of cable payed out and taken in at the surface as the tool is lowered and raised in the well bore, generating a measuring function representative of a measured value of the tension on the cable at the surface, generating a second function including a component derived by integrating said measuring function with respect to said first function for the generation of said second function which is representative of the change in cable length due to changes in said tension, and adding said second function to said first function to produce a third function representative of the tool position within said well bore.

5. The method of determining the position in a well bore of a tool supported by a cable subject to change in length with change in tension thereon, comprising the steps of generating a first function representative of the length of cable measured at a surface measuring station as it passes the measuring station to raise and lower the tool in the well bore, generating a measuring function representative of a measured value of tension on the cable at the measuring station, generating a second function of sign opposite to that of said first function and determined solely from said first function and said measuring function and indicative of the difference in the length of cable as measured at the measuring station and the length which the cable would have under a known distribution of tension along the length thereof, generating a third function of the same sign as said first function determined from said first function and said measuring function and indicative of the difference in the true length of the cable and the length which the cable would have under a known distribution of tension along its length, and algebraically adding said first, second, and third functions to produce an output function representative of the position of said tool in said well bore.

6. The method of determining the position in a well bore of a tool supported by a cable subject to change in length with change in tension thereon, comprising the steps of generating a first function representative of the length of cable measured at a surface measuring station as it passes the measuring station to raise and lower the tool in the well bore, generating a measuring function representative of a measured value of the tension on the cable at the measuring station, integrating said measuring function with respect to said first function to generate a second function indicative of the difference in the length of cable as measured at the measuring station and the length which the cable would have under a known distribution of tension along the length thereof, generating a third function determined from said first function and said measuring function and indicative of the difference between the true length of the cable and the length which the cable would have under a known distribution of tension along its length, and algebraically adding said first, second, and third functions with the sign of said second function opposite that of said first and said third functions to indicate the position of the tool in the well bore.

7. The method of determining the position in a well bore of a tool supported by a cable subject to change in length with change in tension thereon, comprising the steps of generating a first function having a magnitude dependent upon, and which increases with, the length of cable payed out as the tool is lowered in the well bore and which decreases as cable is taken in at the surface to raise the tool in the well bore, generating a measuring function representative of a measured value of the tension on the cable at the surface, generating a second function including the product of said first function and said measuring function multiplied by one-half of the stretch coefficient of the cable and representing the change in cable length due to change in tension thereon, and adding said first function and said second function to produce a third function representative of the position of the tool within the well bore.

8. The method of determining the position in a well bore of a tool supported by a cable subject to change in length with change in tension thereon, comprising the steps of generating a first function having a magnitude dependent upon, and which increases with, the length of cable payed out as the tool is lowered in the well bore and which decreases as cable is taken in at the surface to raise the tool in the well bore, generating a second function representative of the tension on the cable at the surface minus a fixed quantity representative of a selected reference tension, generating a third function including the product of said first function and said second function multiplied by one-half of the stretch coefficient of the cable and representing the change in cable length due to change in tension thereon, and adding said first function and said third function to produce a fourth function representative of the position of the tool within the well bore.

9. The method of determining the position in a well bore of a tool supported by a cable subject to change in length with change in tension thereon, said cable having a known stretch coefficient, comprising the steps of generating a first function representative of the length of cable measured at a surface measuring station as it passes the measuring station to raise and lower the tool in the well bore, generating a measuring function representative of the measured value of the tension on the cable at the measuring station, generating a second function by integrating with respect to said first function the product of said measuring function and the stretch coefficient of said cable, generating a third function representative of the product of said stretch coefficient and said measuring function multiplied by the magnitude of cable length determined at least in part by said first function, and algebraically adding said first, said second and said third functions with the sign of said second function opposite to the signs of said first and said third functions to produce an output function representative of the position of said tool in said well bore.

10. The method of determining the position in a well bore of a tool immersed in well bore liquid and supported by a cable subject to change in length with change in tension thereon, comprising the steps of generating a first function representative of the length of cable measured at a surface measuring station to raise and lower the tool in the well bore, generating a measuring function representative of a measured value of the tension on the cable at the measuring station, generating a second function determined solely from said first function and said measuring function and indicative of the difference in the length of cable as measured at the measuring station and the length which the cable would have under a known distribution of tension along the length thereof, generating a third function determined from said first function and said measuring function and indicative of the difference in the true length of the cable and the length which the cable would have under a known distribution of tension along its length, generating a fourth function representative of the effect of the weight of well bore liquid displaced by the tool upon the length of cable, and adding said first, second, third and fourth functions.

11. The method of claim 10 which includes the step of sensing for the immersion of the tool in the well bore liquid and, when the tool is immersed in the liquid, introducing said fourth function.

12. The method of claim 10 in which said first and second functions are added and then multiplied by the weight of the well bore liquid displaced by the tool to generate said fourth function.

13. The method of claim 10 in which said first function is multiplied by the weight of the well bore liquid displaced by the tool to generate said fourth function.

14. The method of determining the position in a well bore of a tool supported by a cable subject to change in length with change in tension thereon, comprising the steps of generating a first function representative of the length of cable measured at a surface measuring station as it passes the measuring station to raise and lower the tool in the well bore, generating a measuring function representative of a measured value of the tension on the cable at the measuring station, generating a second function determined solely from said first function and said measuring function and indicative of the length which the cable would have under a known distribution of tension along the length thereof, generating a third function determined from said second function and said measuring function and indicative of the difference in the true length of the cable and the length which the cable would have under a known distribution of tension along its length, and adding said second and third functions.

15. The method of claim 14 in which the generation of said second function includes the step of integrating said measuring function with respect to said first function and over limits determined by said first function.

16. The method of claim 14 in which said third function is generated by multiplying said second function by said measuring function.

17. The method of determining the position in a well bore partially filled with liquid of a tool supported by a cable subject to change in length with change in tension thereon, comprising the steps of generating a first function representative of the length of cable measured at a surface measuring station as it passes the measuring station to raise and lower the tool in the well bore, generating a measuring function representative of a measured value of the tension on the cable at the measuring station, generating a second function determined solely from said first function and said measuring function and indicative of the length which the cable would have under a known distribution of tension along the length thereof, generating a third function determined from said second function and said measuring function and indicative of the difference in the true length of the cable and the length which the cable would have under a known distribution of tension along its length, upon immersion of the tool in said liquid generating a signal representative of a change in cable length due to the buoyant effect of the liquid upon the cable as represented by the weight of liquid displaced by the cable, and adding said signal together with said second and third functions.

18. The method of determining the position in a well bore partially filled with liquid of a tool supported by a cable subject to change in length with change in tension thereon, comprising the steps of generating a first function representative of the length of cable measured at a surface measuring station as it passes the measuring station to raise and lower the tool in the well bore, generating a measuring function representative of a measured value of the tension on the cable at the measuring station, generating a second function determined solely from said first function and said measuring function and indicative of the length which the cable would have under a known distribution of tension along the length thereof, generating a third function determined from said second function and said measuring function and indicative of the difference between the true length of the cable and the length which the cable would have under a known distribution of tension along its length, sensing for the immersion of the tool in the liquid, upon immersion of the tool in the liquid generating a signal representative of a change in cable length due to the buoyant effect of the liquid upon the cable as represented by the weight of liquid displaced by the cable, generating a fourth function representative of a change in cable length due to the buoyant effect of the well bore liquid upon the tool as represented by the weight of the liquid displaced by the tool, and adding said signal and said second, third, and fourth functions.

19. The method of determining the position in a well bore of a tool supported by a cable subject to change in length with change in tension thereon, comprising the steps of generating a first function representative of the length of cable measured at a surface measuring station as it passes the measuring station to raise and lower the tool in the well bore, generating a measuring function representative of a measured value of the tension on the cable at the measuring station, converting said measuring function to the form $$\frac{Y}{1+Y}$$

where Y is the measuring function multiplied by a constant, integrating with respect to said first function said converted measuring function to generate a second function indicative of the difference in the length of cable as measured at the measuring station and the length which the cable would have under a known distribution of tension along the length thereof, generating a third function determined from said first function, said second function and said measuring function and indicative of the difference in the true length of the cable and the length which the cable would have under a known distribution of tension along its length, and adding said first, second, and third functions.

20. The method of determining the position in a well bore of a tool supported by a cable subject to change in length with change in tension thereon, comprising the steps of generating a first function representative of the length of cable measured at a surface measuring station as it passes the measuring station to raise and lower the tool in the well bore, measuring at least a part, $t_m$, of the tension on the cable at the measuring station, generating from said measured tension on said cable a signal corresponding with $$\frac{Kt_m}{1+Kt_m}$$

where K is a constant, integrating said signal with respect to said first function, subtracting the result of said integration from said first function to produce a second function, multiplying said second function by said measured tension $t_m$ to produce a third function, and adding said second function and said third function to produce an output signal representative of the position in the well bore of the tool.

21. The method of determining the position in a well bore of a tool supported by a cable subject to change in length with change in tension thereon, comprising the steps of generating a first function representative of the length of cable measured at a surface measuring station as it passes the measuring station to raise and lower the tool in the well bore, generating a measuring function representative of a measured value of the tension on the cable at the measuring station, integrating said measuring function with respect to said first function to generate a second function indicative of the difference in the length of cable as measured at the measuring station and the length which the cable would have under a known distribution of tension along the length thereof, integrating said first function with respect to said measuring function to generate a third function indicative of the difference between the true length of the cable and the length which the cable would have under a known distribution of tension along its length, and adding said first, second, and third functions.

22. The method of determining the position in a well bore of a tool supported by a cable subject to change in length with change in tension thereon, comprising the steps of generating a first function representative of the length of cable measured at a surface measuring station as it passes the measuring station to raise and lower the tool in the well bore, measuring at least a part of the tension on the cable at the measuring station to produce a tension function, initially integrating said tension function with respect to said first function to generate a second function indicative of the difference in the length of cable as measured at the measuring station and the length which the cable would have under a known distribution of tension along the length thereof, initially integrating said first function with respect to said tension function to generate a third function indicative of the difference in the true length of the cable and the length which the cable would have under a known distribution of tension along its length, adding said first, second, and third functions to produce a fourth function representative of the true length of the cable, and thereafter integrating said tension function with respect to said fourth function to generate the second function, integrating said fourth function with respect to said tension function to generate said third function, and adding said first, second, and third functions.

23. The method of determining the position in a well bore of a tool supported by a cable provided with markers placed thereon with said cable under a predetermined reference tension, comprising the steps of generating from said markers as said cable is passed into and out of the well bore at a measuring station a first function representative of the length said cable would have if under said reference tension, generating a second function representative of the length of cable measured at said measuring station as it passes that station, generating a measuring function representative of a measured value of the tension on the cable at the measuring station, generating from said first function, said second function and said measuring function a corrective function, and adding said corrective function to said first function to produce an output function varying with the position of said tool in said well bore.

24. The method of determining the position in a well bore of a tool supported by a cable provided with equally spaced markers and subject to change in length with change in tension thereon, comprising the steps of generating a first function representative of the length of cable measured at a surface measuring station as it passes the measuring station to raise and lower the tool in the well bore, generating a measuring function representative of a measured value of the tension on the cable at the measuring station, generating a second function determined from said first function and said measuring function and representative of the length which the cable would have under a known distribution of tension along the length thereof, detecting said markers, correcting said second function in accordance with deviations of said second function from values represented by the occurrence of said markers to produce a corrected second function, generating a third function determined from said corrected second function and said measuring function and indicative of the difference in the true length of the cable and the length which the cable would have under a known distribution of tension along its length, and adding said corrected second function and said third function.

25. The method of determining the position in a well bore of a tool supported by a cable provided at a time when the cable is under a predetermined tension with markers spaced at known distances one from the other and subject to change in length with change in tension thereon, comprising the steps of generating a first function representative of the length of cable measured at a surface measuring station as it passes the measuring station to raise and lower the tool in the well bore, detecting said markers, generating a second function by modifying said first function in amounts represented by deviations of said first function from predetermined values represented by said markers, said second function being representative of the length which the cable would have under a known distribution of tension along the length thereof, generating a measuring function representative of a measured value of the tension on the cable at the measuring station, generating a third function determined from said second function and said measuring function and indicative of the difference of the true length of the cable and the length which the cable would have under a known distribution of tension along its length, and adding said second and third functions.

26. The method of determining the position in a well bore of a tool supported by a cable subject to change in length with change in tension thereon, comprising the steps at a measuring station of generating a first function having a magnitude dependent upon, and which increases with, the length of cable payed out as the tool is lowered into the well bore, and which decreases as cable is taken in at the surface to raise the tool in the well bore, generating a measuring function representative of a measured value of the tension on the cable at the measuring station, combining said first function and said measuring function with a stretch coefficient of the cable in the following relationship $$l - \int_0^l K t_m dx + l\frac{K}{2} T_m$$

to generate an output function representative of the true length of the cable from the measuring station to the tool where:

$K$ is the stretch coefficient of the cable,
$t_m$ is the measuring function,
$dx$ represents the incremental change in said first function, and
$l$ is representative of said first function, and moving an indicating element in accordance with said output function.

27. The method of claim 26 in which $l$ represents the length of cable $l_m$ passing said measuring station into and out of said well bore and $dx$ represents the incremental change in $l_m$.

28. The method of claim 26 in which $l$ in the last term of said relationship is equal to $l'_0$ which is the length the cable would have if under a predetermined reference tension and in which $l$ in the first two terms represents the length of cable $l_m$ passing said measuring station into and out of said well bore, and further in which $dx$ represents the incremental change in $l_m$.

29. The method of moving a recording chart in accordance with the depth of a logging tool supported by a cable subject to change in length with change in tension thereon, comprising the steps of generating a first function $l_m$ representative of the length of cable measured at a surface measuring station as it passes the measuring station to raise and lower the tool in the well bore, measuring at least a fraction, $t_m$, of the tension on the cable at the measuring station, combining said first function and said tension in the relationship $$l_m - \frac{K}{2}\int_0^{l_m} t_m dx_m + \frac{K}{2}\int_0^{T_m} x_m dt_m$$

to obtain the true length of the cable from the measuring station to the tool, where:

$K$ is the stretch coefficient of the cable,
$T_m$ is the final value of measured tension,
$dt_m$ represents the incremental changes in the measured tension,
$x_m$ represents past values of $l_m$, and
$dx_m$ represents the incremental changes in $x_m$, and moving the chart in accordance with the magnitude of said relationship.

30. A system for determining the position in a well bore of a tool supported by a cable subject to change in length with change in tension thereon, comprising means for generating a first function representative of the length of cable payed out and taken in at the surface as the tool is lowered and raised in the well bore, means for measuring at least a fraction, $t_m$, of the tension on the cable at the surface to produce a tension function, means for generating a second function derived from said first function and said tension function and representative of the change in cable length due to changes in said tension function, and means for adding said second function to said first function to produce a third function representative of the tool position.

31. A system for determining the position in a well bore of a tool supported by cable subject to change in length with change in tension thereon, comprising means for generating a first function representative of the length of cable passing into and out of the well bore, measuring means for generating a tension function representative of at least a fraction of the tension on the cable at a location adjacent the mouth of the well bore, means, including an integrator for integrating said tension function with respect to said first function, for generating a second function representative of the difference between the true position of the tool in the well bore and the position of the tool as indicated by said first function, and means for algebraically adding said first function and said second function to obtain an output function representative of the position of said tool in said well bore.

32. The combination with a logging tool suspended in a well bore by a cable having reeling means for taking in and paying out cable to raise and lower said tool, said cable elongating and contracting with change in the magnitude of tensional forces applied thereto, and subject to dynamic opposing forces, of means for indicating the position of said tool including a position-indicating element, driving means for driving said element in one direction when paying out cable and in the opposite direction when taking in cable, means responsive to the magnitude of the tension on said cable for controlling said driving means to move said element as said reeling means comes to standstill after a downward movement of the tool by an amount corresponding with the elongation of said cable due to increase in tension on said cable resulting from the disappearance of dynamic opposing forces and for maintaining said element at standstill when said cable is reeled in until the increase in tension on said cable rises to a magnitude adequate to overcome said dynamic opposing forces, and means for controlling said driving means to move said element in correspondence with movement of said tool when said tension is above a tool-moving magnitude.

33. A system for indicating the position of a tool suspended in a well bore by a cable, which cable is subject to elongation and contraction with change in tensional forces applied thereto, and which is subject to dynamic opposing forces, which comprises reeling means for taking in cable to increase the tension applied to said cable to overcome the combined weight of said cable and of said tool and the dynamic forces acting in opposition to upward movement of said tool and cable, said reeling means being operative to pay out cable to decrease the tension thereof so that said combined weight is effective to overcome dynamic forces acting in opposition to downward movement of said tool, a tool position-indicating element, driving means for driving said element in one direction when said reeling means is paying out cable and in the opposite direction when taking in cable, means responsive to tension on said cable in the region of said reeling means for producing an output function whose magnitude is representative of at least a fraction of said tension, and means operable in response to said output function for producing movement of said element as said reeling means comes to standstill after a downward movement of the tool by an amount corresponding with the elongation of said cable due to the increase in tension on the cable resulting from the disappearance of said dynamic opposing forces, and for maintaining said element at standstill when said cable is reeled in until the increase in tension on said cable rises to a magnitude adequate to overcome said dynamic opposing forces to produce upward movement of the tool.

34. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of tension on the cable at the measuring station to produce a tension function, means for generating a second function determined solely from said first function and said tension function produced at said measuring station and indicative of the difference in the length of cable as measured at the measuring station and the length which the cable would have under a known distribution of tension along the length thereof, means for generating a third function determined from said first function and said tension function produced at said measuring station and indicative of the difference in the true length of the cable and the length which the cable would have under a known distribution of tension along its length, and means for adding said first, second, and third functions.

35. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of tension on the cable at the measuring station, means for integrating said tension with respect to said first function to generate a second function indicative of the difference in the length of cable as measured at the measuring station and the length which the cable would have under a known distribution of tension along the length thereof, means for generating a third function determined from said first function and said tension measured at said measuring station and indicative of the difference in the true length of the cable and the length which the cable would have under a known distribution of tension along its length, and means for adding said first, second, and third functions.

36. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function and for generating a mechanical signal representative of said tension function, means mechanically coupled to said measuring means for producing a second mechanical signal proportional to said tension function and an electrical signal proportional to said tension function, means for generating solely from said first function and said second mechanical signal a second function indicative of the difference in the length of cable as measured at the measuring station and the length which the cable would have under a known distribution of tension along the length thereof, means for generating from said first function and said electrical signal a third function indicative of the difference in the true length of the cable and the length which the cable would have under a known distribution of tension along its length, and means for adding said first, second, and third functions.

37. The system of claim 36 in which said means for measuring a magnitude of the tension comprises a first bridge circuit responsive to changes in tension at the measuring station to produce an electrical signal representative of variations in the tension, a null-balance measuring system responsive to said electrical signal for producing an equivalent mechanical signal, and in which said mechanically coupled means comprises a second bridge circuit having an adjustable contact mechanically coupled to the output of said null-balance measuring system for producing an unbalance signal representative of variations in the tension as measured at the measuring station, and a second null-balance system responsive to signals produced by said second bridge circuit.

38. A system for determining the position in a well bore of a tool immersed in well bore liquid and supported by a cable subject to change in length with change in tension thereon, comprising means for generating a first function representative of the length of cable measured at a surface measuring station as it passes the measuring station to raise and lower the tool in the well bore, means for generating a signal representative of a measured magnitude of the tension on the cable at the measuring station, means for generating a second function determined solely from said first function and said signal representative of a meansured magnitude of the tension and indicative of the difference in the length of cable as measured at the measuring station and the length which the cable would have under a known distribution of tension along the length thereof, means for generating a third function determined from said first function and said signal representative of a measured magnitude of the tension and indicative of the difference in the true length of the cable and the length which the cable would have under a known distribution of tension along its length, means for generating a fourth function representative of the effect of the weight of well bore liquid displaced by the tool upon the length of cable, and means for adding said first, second, third, and fourth functions.

39. The system of claim 38 in which there is provided means for sensing for the immersion of the tool in the well bore liquid, and means for introducing said fourth function when the tool is immersed in the liquid.

40. The system of claim 38 in which there is provided means for adding said first and second functions to produce a summation function, and means for multiplying said summation function by the weight of well bore liquid displaced by the tool to generate said fourth function.

41. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, means for generating a second function determined solely from said first function and said tension function and indicative of the length which the cable would have under a known distribution of tension along the length thereof, means for generating a third function determined from said second function and said tension function and indicative of the difference in the true length of the cable and the length which the cable would have under a known distribution of tension along its length, and means for adding said second and third functions.

42. The system of claim 41 in which said means for generating said second function includes an integrating means for integrating said tension function with respect to said first function and over limits determined by said first function.

43. The system of claim 41 in which there is provided means for multiplying said second function by said tension function to produce said third function.

44. A system for determining the position in a well bore partially filled with liquid of a tool supported by a cable at least a portion of which will be immersed in the liquid and in which the cable is subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, means for generating a second function determined solely from said first function and said tension function and indicative of the length which the cable would have under a known distribution of tension along the length thereof, means for generating a third function determined from said second function and said tension function and indicative of the difference in the true length of the cable and the length which the cable would have under a known distribution of tension along its length, means for sensing for the immersion of the tool in the liquid, means effective upon immersion of the tool in the liquid for generating a signal representative of a change in cable length due to the buoyant effect of the liquid upon the cable as represented by the weight of liquid displaced by the cable, and means for adding said signal together with said second and third functions.

45. A system for determining the position in a well bore partially filled with liquid of a tool supported by a cable to be immersed at least in part in the liquid and subject to change in length with change in tension thereon, comprising means for generating a first function representative of the length of a cable measured at a surface measuring station as it passes the measuring station to raise and lower the tool in the well bore, means for measuring a magnitude of the tension on the cable at the measuring station to produce a tension function, means for generating a second function determined solely from said first function and said tension function and indicative of the length which the cable would have under a known distribution of tension along the length thereof, means for generating a third function determined from said second function and said tension function and indicative of the difference in the true length of the cable and the length which the cable would have under a known distribution of tension along its length, means for sensing the immersion of the tool in the liquid, means operable upon immersion of the tool in the liquid for generating a signal representative of a change in cable length due to the buoyant effect of the liquid upon the cable as indicated by the weight of liquid displaced by the cable, a second means operable upon immersion of the tool in the liquid for generating a fourth function representative of a change in cable length due to the buoyant effect of the well bore liquid upon the tool and as represented by the weight of the liquid displaced by the tool, and means for adding said signal and said second, third, and fourth functions.

46. A system for determining the position in a well bore of a tool supported by a cable subject to change in length with change in tension thereon, comprising means for generating a first mechanical signal representative of the length of cable measured at a surface measuring station as it passes the measuring station to raise and lower the tool in the well bore, means for measuring a magnitude of the tension on the cable at the measuring station to produce a tension function and for producing an electrical signal and a second mechanical signal respectively representative of said tension function, a mechanical integrator, means for applying said first mechanical signal as a differential to said integrator, means for applying said second mechanical signal to said integrator as an integrand, said mechanical integrator having an output shaft whose rotation is representative of the difference in the length of cable as measured at the measuring station and the length which the cable would have under a known distribution of tension along the length thereof, a first mechanical arithmetic means, means for applying said first mechanical signal and the output of said integrator to said first arithmetic means for generation by said first arithmetic means of a mechanical output signal representative of the length which the cable would have under a known distribution of tension along the length thereof, first converter means for converting the output of said first mechanical arithmetic means to an electrical signal representative of the length which the cable would have under a known distribution of tension along the length thereof, means for multiplying said electrical signal representative of the length which the cable would have under a known distribution of tension along the length thereof and said electrical signal representative of said tension function to produce a signal indicative of the difference in the true length of the cable and the length which the cable would have under a known distribution of tension along its length, second converter means for converting the output of said multiplying means to an equivalent mechanical signal, a second mechanical arithmetic means, and means for applying the output of said first arithmetic means and the output of said second converter means to said second arithmetic means to produce a signal representative of the position of the tool in the well bore.

47. A system for determining the position in a well bore of a tool supported by a cable subject to change in length with change in tension thereon, comprising means for generating a first signal representative of the length of cable measured at a surface measuring station as it passes the measuring station to raise and lower the tool in the well bore, means for measuring a magnitude of the tension on the cable at the measuring station to produce a tension function and for producing a second signal and a third signal both representative of said tension function, an integrator, means for applying said first signal as a differential to said integrator, means for applying said second signal representative of tension to said integrator as an integrand, said integrator having an output representative of the difference in the length of cable as measured at the measuring station and the length which the cable would have under a known distribution of tension along the length thereof, a first arithmetic means, means for applying said first signal and the output of said integrator to said first arithmetic means for generation by said first arithmetic means of an output signal representative of the length which the cable would have under a known distribution of tension along the length thereof, means for multiplying said first arithmetic means output signal and said third signal representative of said tension function to produce a product signal indicative of the difference in the true length of the cable and the length which the cable would have under a known distribution of tension along its length, a second arithmetic means, and means for applying the output signal of said first arithmetic means and said product signal to said second arithmetic means to produce a signal representative of the position of the tool in the well bore.

48. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, means for generating a second function determined solely from said first function and said tension function and indicative of the difference in the length of cable as measured at the measuring station and the length which the cable would have under a known distribution of tension along the length thereof, means for adding said first and second functions to generate a third function indicative of the length which the cable would have under a known distribution of tension along the length thereof, means for generating a fourth function determined from said third function and said tension function and indicative of the difference in the true length of the cable and the length which the cable would have under a known distribution of tension along its length, and means for adding said third and fourth functions.

49. A system as in claim 48 in which said means for generating said second function comprises an integrator for integrating said tension function with respect to said first function.

50. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, means for integrating said tension function with respect to said first function to generate a second function indicative of the difference in the length of cable as measured at the measuring station and the length which the cable would have under a known distribution of tension along the length thereof, means for integrating said first function with respect to said tension function to generate a third function indicative of the difference in the true length of the cable and the length which the cable would have under a known distribution of tension along its length, and means for adding said first, second, and third functions.

51. A system for determining the position in a well bore of a tool supported by a cable subject to change in length with change in tension thereon, comprising means for generating a first mechanical signal representative of the length of cable measured at a surface measuring station as it passes the measuring station to raise and lower the tool in the well bore, means for measuring a magnitude of the tension on the cable at the measuring station to produce a tension function and for producing an electrical signal and a mechanical signal both representative of said tension function, a mechanical integrator, means for applying said first mechanical signal as a differential to said integrator, means for applying said mechanical signal representative of tension to said integrator as an integrand, said mechanical integrator having an output shaft whose rotation is representative of the difference in the length of cable as measured at the measuring station and the length which the cable would have under a known distribution of tension along the length thereof, means for converting said rotation of said output shaft of said integrator to a second electrical signal, a potentiometer having a movable contact, means for applying said electrical signal representative of said tension function across said potentiometer, means for adjusting said movable contact in accordance with said first mechanical signal to produce an electrical product signal representative of the product of said first mechanical signal and said electrical signal representative of said tension function, means for adding said product signal and said second electrical signal to produce a signal representative of the difference between the true length of the cable and the measured length of the cable, means for converting said signal representative of the difference between the true length of the cable and the measured length of the cable to an equivalent mechanical signal, a mechanical arithmetic means, and means for applying said equivalent mechanical signal and said first mechanical signal to said arithmetic means to produce a signal representative of the position of the tool in the well bore.

52. A system for determining the position in a well bore of a tool supported by a cable subject to change in length with change in tension thereon, comprising means for generating a first mechanical signal and a first electrical signal both representative of the length of cable measured at a surface measuring station as it passes the measuring station to raise and lower the tool in the well bore, means for measuring a magnitude of the tension on the cable at the measuring station to produce a tension function and for producing a second mechanical signal representative of said tension function, a first mechanical integrator, means for applying said first mechanical signal as a differential to said integrator, means for applying said second mechanical signal to said integrator as an integrand, said mechanical integrator having an output shaft whose rotation is indicative of the difference in the length of cable as measured at the measuring station and the length which the cable would have under a known distribution of tension along the length thereof, a second mechanical integrator, means for applying said second mechanical signal as a differential to said second integrator, means for applying said first mechanical signal to said second integrator as an integrand, said integrator having an output shaft whose rotation is indicative of the difference in the true length of the cable and the length which the cable would have under a known distribution of tension along its length, means for adding the outputs of said integrators to produce a summation signal representative of the difference between the measured length of the cable and the true length of the cable, an arithmetic means, and means for applying said summation signal and said first electrical signal to said arithmetic means to produce a signal representative of the position of the tool in the well bore.

53. A system for determining the position in a well bore of a tool immersed in well bore liquid and supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, means for generating a second function determined solely from said first function and said tension function and indicative of the difference in the length of the cable as measured at the measuring station and the length which the cable would have under a known distribution of tension along the length thereof, means for multiplying said first function and said tension function to generate a third function indicative of the difference in the true length of the cable and the length which the cable would have under a known distribution of tension along its length, means for generating a fourth function representative of the effect of the weight of well bore liquid displaced by the tool upon the length of cable, and means for adding said first, second, third, and fourth functions.

54. A system for determining the position in a well bore of a tool immersed in well bore liquid and supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, means for integrating said tension function with respect to said first function to generate a second function indicative of the difference in the length of cable as measured at the measuring station and the length which the cable would have under a known distribution of tension along the length thereof, means for integrating said first function with respect to said tension function to generate a third function indicative of the difference in the true length of the cable and the length which the cable would have under a known distribution of tension along its length, means for generating a fourth function representative of the effect of the weight of well bore liquid displaced by the tool upon the length of cable, and means for adding said first, second, third and fourth functions.

55. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, means for integrating said tension function with respect to said first function to generate a second function indicative of the difference in the length of cable as measured at the measuring station and the length which the cable would have under a known distribution of tension along the length thereof, means for integrating said first function with respect to said tension function to generate a third function indicative of the difference in the true length of the cable and the length which the cable would have under a known distribution of tension along its length, means for adding said second and third functions to generate a fourth function representative of the difference in the true length of the cable and the measured length of the cable as represented by said first function, and means for adding said first and fourth functions.

56. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, first and second wheel and disc integrators, means for applying said first function as a differential to the disc of said first integrator, means including a first gear reducer for coupling the disc of said first integrator to the wheel of said second integrator to apply said first function as an integrand to the wheel of said second integrator, means for applying said tension function as a differential to the disc of said second integrator, means including a second gear reducer for coupling said disc of said second integrator to the wheel of said first integrator to apply said tension function as an integrand to said first integrator, said first gear reducer having the same reduction as said second gear reducer, the output of said first integrator being a second function indicative of the difference in the length of cable as measured at the measuring station and the length which the cable would have under a known distribution of tension along the length thereof, the output of said second integrator being a third function indicative of the difference in the true length of the cable and the length which the cable would have under a known distribution of tension along its length, means for adding said second and third functions to produce a fourth fuction representative of the difference in the true length of the cable and the measured length of the cable as represented by said first function, and means for adding said first and fourth functions.

57. A system for determining the position in a well bore of a tool supported by a cable subject to change in length with change in tension thereon, comprising means for generating a first digital signal representative of increments of cable passing a measuring station, means for generating a first analogue signal representative of the length of cable measured at a surface measuring station as it passes the measuring station to raise and lower the tool in the well bore, means for generating a second digital signal representative of a measured magnitude of the tension on the cable at the measuring station to produce a tension function, means for generating a second analogue signal representative of said tension function on the cable at the measuring station, a first pulse generating means responsive to said first digital signal for producing a plurality of first pulses the number of which is related to the magnitude of said second analogue signal, a first adding means for adding said first pulses to produce a third signal indicative of the difference in the length of cable as measured at the measuring station and the length which the cable would have under a known distribution of tension along the length thereof, second pulse generating means responsive to said second digital signal for producing a series of second pulses the number of which is determined by the magnitude of said first analogue signal, means for adding said second pulses to produce a fourth signal indicative of the difference in the true length of the cable and the length which the cable would have under a known distribution of tension along its length, means for adding said third and fourth signals to produce a fifth signal representative of the difference between the measured length of the cable and the true length of the cable, and means for adding said fifth signal to said first analogue signal to produce a signal representative of the position of the tool in the well bore.

58. The system of claim 57 in which said first pulse generating means comprises a gating pulse generator responsive to said first digital signal for producing a gating pulse whose length is determined by the magnitude of said second analogue signal, an oscillator for producing uniformly spaced pulses, and a gate responsive to said gating pulse to pass a predetermined number of pulses from said oscillator to said first adding means.

59. A system for determining the position in a well bore of a tool supported by a cable subject to change in length with change in tension thereon, comprising a tool-position indicator, means for generating a first function representative of the length of cable measured at a surface measuring station as the cable passes the measuring station to raise and lower the tool in the well bore, means for measuring at least a part of the tension on the cable at the measuring station to produce a tension function, a first integrating means, a second integrating means, an arithmetic means having at least two inputs and an output, means for applying the combined outputs of said integrating means to a first input of said arithmetic means, means for applying said first function to a second input of said arithmetic means, means connected to the output of said arithmetic means for applying a first output signal to said first and said second integrating means, said first integrating means providing a second output signal representative of the integration of said tension function with respect to said first output signal and representative of the difference in the length of cable as measured at the measuring station and the length which the cable would have under a known distribution of tension along the length thereof, said second integrating means providing a third output signal representative of the integration of said first output signal with respect to said tension function and indicative of the difference in the true length of the cable and the length which the cable would have under a known distribution of tension along its length, means for combining said second and said third output signals to produce a combined signal, and means for applying said combined signal to said tool-position indicator to drive said tool-position indicator in accordance with the true position of the tool in the well bore.

60. A system for driving a recording chart in accordance with the depth of a logging tool supported by a cable subject to change in length with change in tension thereon, comprising means for generating a first function $l_m$ representative of the length of cable measured at a surface measuring station as it passes the measuring station to raise and lower the tool in the well bore, means for measuring a magnitude $t_m$ of the tension on the cable at the measuring station, means for combining said first function and said tension in the relationship $$l_m - \frac{K}{2}\int_0^{l_m} t_m dx_m + \frac{K}{2}\int_0^{T_m} x_m dt_m$$

to obtain the true length of the cable from the measuring station to the tool,
where:

K is the stretch coefficient of the cable,
$T_m$ is the last-measured value of tension,
$dt_m$ represents the incremental changes in the measured tension,
$x_m$ represents the past values of the measured length $l_m$, and
$dx_m$ represents the incremental changes in $x_m$, and means for moving the chart in accordance with the magnitude of said relationship.

61. A system for driving a recording chart in accordance with the depth of a logging tool supported by a cable subject to change in length with change in tension thereon, comprising means for generating a first function $l_m$ representative of the length of cable measured at a surface measuring station as it passes the measuring station to raise and lower the tool in the well bore, means for measuring a magnitude $t_m$ of the tension on the cable at the measuring station, means for combining said first function and said tension in the relationship $$l_m - \int_0^{l_m} K t_m dx_m + l_m \frac{K}{2} T_m$$

to obtain the true length of the cable from the measuring station to the tool,
where:

K is the stretch coefficient of the cable,
$T_m$ is the last-measured value of tension, and
$dx_m$ represents the incremental change in the first function, and means for moving the chart in accordance with the magnitude of said relationship.

62. A system for determining the position in a well bore of a tool supported by a cable provided with markers placed thereon at predetermined locations with said cable under a predetermined reference tension, comprising means for generating from said markers as said cable is passed into and out of the well bore at a measuring station a first function representative of the length said cable would have if under said reference tension, means for generating a second function representative of the length of cable measured at said station as it passes that station, means for generating a tension function representative of a measured value of the tension on the cable at the measuring station, means for generating from said first function, said second function and said tension function a corrective function, and means for adding said corrective function to said first function to produce an output function varying with the position of said tool in said well bore.

63. A system for determining the position in a well bore of a tool supported by a cable provided with markers spaced predetermined distances one from the other when the cable is under a known distribution along its length of a predetermined tension and subject to change in said distances with change in tension on the cable, comprising means for generating a first function representative of the length of cable measured at a surface measuring station as it passes the measuring station to raise and lower the tool in the well bore, means for measuring a magnitude of the tension on the cable at the measuring station to produce a tension function, means for generating a second function determined from said first function and said tension function and representative of the length which the cable would have under said known distribution of tension along the length thereof, means for detecting said markers, means for correcting said second function in accordance with deviations of said second function from values represented by change in the positions of said markers due to departure of the tension on said cable from said predetermined tension to produce a corrected second function, means for generating a third function determined from said corrected second function and said tension function and indicative of the difference in the true length of the cable and the length which the cable would have under said known distribution of tension along its length, and means for adding said corrected second function and said third function.

64. A system for determining the position in a well bore of a tool supported by a cable provided with equally spaced markers when under a known distribution along its length of a predetermined reference tension and subject to change in length with change in tension from said reference tension, comprising means for generating a first function representative of the length of cable measured at a surface measuring station as it passes the measuring station to raise and lower the tool in the well bore, means for detecting said markers, means for generating a second function by modifying said first function in amounts represented by deviations of said first function from predetermined values represented by said markers, said second function being representative of the length which the cable would have under said known distribution of tension along the length thereof, means for measuring a selected magnitude of the tension on the table at the measuring station to produce a tension function, means for generating a third function determined from said second function and said tension function and indicative of the difference of the true length of the cable and the length which the cable would have under said known distribution of tension along its length, and means for adding said second and third functions.

65. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, means for converting said tension function to the form $$\frac{Y}{1+Y}$$

where Y is representative of said tension function multiplied by a constant, means for integrating said tension function in said form $$\frac{Y}{1+Y}$$

with respect to said first function to generate a second function indicative of the difference in the length of cable as measured at the measuring station and the length which the cable would have under a known distribution of tension along the length thereof, means for generating a third function determined from said first function, said second function and said tension function and indicative of the difference in the true length of the cable and the length which the cable would have under a known distribution of tension along its length, and means for adding said first, second, and third functions.

66. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, means for converting said tension function to the form $$\frac{Y}{1+Y}$$

where Y is representative of said tension function multiplied by a constant, said converting means comprising means for producing a signal representative of said tension function, a null-balance system having an input circuit and an output circuit, means for applying said signal to said input circuit, means coupled between said output circuit and said signal-producing means for feeding back a portion of the signal from said output circuit to adjust the magnitude of the signal produced by said signal-producing means, means for integrating the output signal from said null-balance system with respect to said first function to generate a second function indicative of the difference in the length of cable as measured at the measuring station and the length which the cable would have under a known distribution of tension along the length thereon, means for generating a third function determined from said first function, said second function and said tension function and indicative of the difference in the true length of the cable and the length which the cable would have under a known distribution of tension along its length, and means for adding said first, second, and third functions.

67. A system for converting a signal Y to the form $$\frac{Y}{1+Y}$$

comprising signal-producing means for generating said signal Y, a null-balance system having an input circuit, an output circuit and means responsive to a signal from the output circuit for balancing said null-balance system, means for applying said signal Y to said input circuit, and means coupled between said output circuit and said signal-producing means for feeding back a portion of said signal from said output circuit to adjust the magnitude of the signal Y produced by said signal-producing means to produce across the output circuit said signal Y in the form $$\frac{Y}{1+Y}$$

68. A system for converting a signal Y to the form $$\frac{Y}{1+Y}$$

comprising means for generating said signal Y, a first potentiometer having a movable contact, means for applying said signal across said first potentiometer, a null-balance system having an input circuit, an output circuit and a balancing potentiometer in said input circuit and of the type being adjustable in response to a signal from said output circuit for balancing said null-balance system, means including said movable contact for applying to said input circuit a portion of said signal across said potentiometer, means in said output circuit of said null-balance system for converting said portion of said signal to an equivalent mechanical signal, means for adjusting said balancing potentiometer in accordance with said equivalent mechanical signal and means including reduction means for applying a portion of said equivalent mechanical signal to said movable contact for adjusting said first potentiometer.

69. The method of determining the position in a well bore of a tool supported by a cable subject to change in length with change in tension thereon, comprising the steps of generating a first function representative of the length of cable measured at a surface measuring station as it passes the measuring station to raise and lower the tool in the well bore, generating a measuring function representative of the tension on the cable at the measuring station, generating a second function determined solely from said first function and said measuring function and indicative of the difference in the length of cable as measured at the measuring station and the length which the cable would have under a known distribution of tension along the length thereof, multiplying said measuring function and said first function to generate a third function indicative of the difference between the true length of the cable and the length which the cable would have under a known distribution of tension along its length, and adding said first, second, and third functions.

70. The method of determining the position in a well bore of a tool supported by a cable subject to change in length with change in tension thereon, comprising the steps of generating a first function representative of the length of cable measured at a surface measuring station as it passes the measuring station to raise and lower the tool in the well bore, generating a measuring function representative of the tension on the cable at the measuring station, generating a second function determined solely from said first function and said measuring function and indicative of the difference in the length of cable as measured at the measuring station and the length which the cable would have under a known distribution of tension along the length thereof, integrating said first function with respect to said measuring function to generate a third function indicative of the difference between the true length of the cable and the length which the cable would have under a known distribution of tension along its length, and adding said first, second, and third functions.

71. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, means for generating a second function determined solely from said first function and said tension function and indicative of the difference in the length of cable as measured at the measuring station and the length which the cable would have under a known distribution of tension along the length thereof, means for multiplying said first function by said tension function to generate a third function indicative of the difference in the true length of the cable and the length which the cable would have under a known distribution of tension along its length, and means for adding said first, second, and third functions.

72. A system for determining the position in a well bore of a tool supported by a cable subject to change in length with change in tension thereon, comprising means for generating a first function representative of the length of cable measured at a surface measuring station as it passes the measuring station to raise and lower the tool in the well bore, means for measuring a magnitude of the tension on the cable at the measuring station to produce a tension function, means for generating a second function determined solely from said first function and said tension function and indicative of the difference in the length of cable as measured at the measuring station and the length which the cable would have under a known distribution of tension along the length thereof, means for integrating said first function with respect to said tension function to generate a third function indicative of the difference in the true length of the cable and the length which the cable would have under a known distribution of tension along its length, and means for adding said first, second, and third functions.

References Cited in the file of this patent

UNITED STATES PATENTS

| | | |
|---|---|---|
| 2,398,562 | Russell | Apr. 16, 1946 |
| 2,669,871 | Lubinski | Feb. 23, 1954 |
| 2,794,951 | Broding et al. | June 4, 1957 |
| 2,815,577 | Ferre | Dec. 10, 1957 |

OTHER REFERENCES

Periodical, Product Engineering, issue of September 1953, pp. 134–140. (A photostat copy is in Div. 23, 235–61 AO.)

UNITED STATES PATENT OFFICE
Certificate of Correction

April 3, 1962

Patent No. 3,027,649

Raymond W. Sloan

It is hereby certified that error appears in the above-numbered patent requiring correction and that the said Letters Patent should read as corrected below.

Column 10, line 8, for "strain gage" read —strain-gage—; line 39, for "36" read —35—; column 14, line 35, for "for" read —of—; line 44, for "right hand" read —right-hand—; column 15, line 56, strike out "to", second occurrence; column 18, lines 58 and 59, in the equation, for the numeral "1" read the letter —$l$—; column 21, line 8, for "1125" read —125—; column 23, line 35, for "tools" read —tool—; column 30, lines 38, 41, and 44, for "$\rho_{\theta_0}$", each occurrence, read —$\rho_{\theta_0}$—; column 30, lines 42 to 44, Equation (32) should appear as shown below instead of as in the patent:

$$\rho_{\theta_0} = \left[\frac{-\rho R_1^0}{R_1+R_2}\right]\left[\frac{C_c C_s K t_m}{K}\right]$$

same column 30, line 74, for "rotation" read —rotational—; column 31, line 62, for "rear" read —gear—; column 32, line 32, for "is" read —in—; column 40, line 60, before "null-balance" insert —first—; column 41, line 1, for "meansured" read —measured—; column 46, line 33, for "fuction" read —function—; column 50, line 31, after "said", second occurrence, insert —first—.

Signed and sealed this 5th day of February 1963

Attest:

[SEAL]

ERNEST W. SWIDER,
*Attesting Officer.*

DAVID L. LADD,
*Commissioner of Patents.*